Nov. 28, 1950

C. A. NICHOLS ET AL 2,531,524

MOLDING MACHINE

Filed Sept. 17, 1947

INVENTORS
Charles A. Nichols,
Max E. Todd,
William A. Fletcher &
Clarence J. Keller By Spencer, Hardman & Gehr
THEIR ATTORNEYS

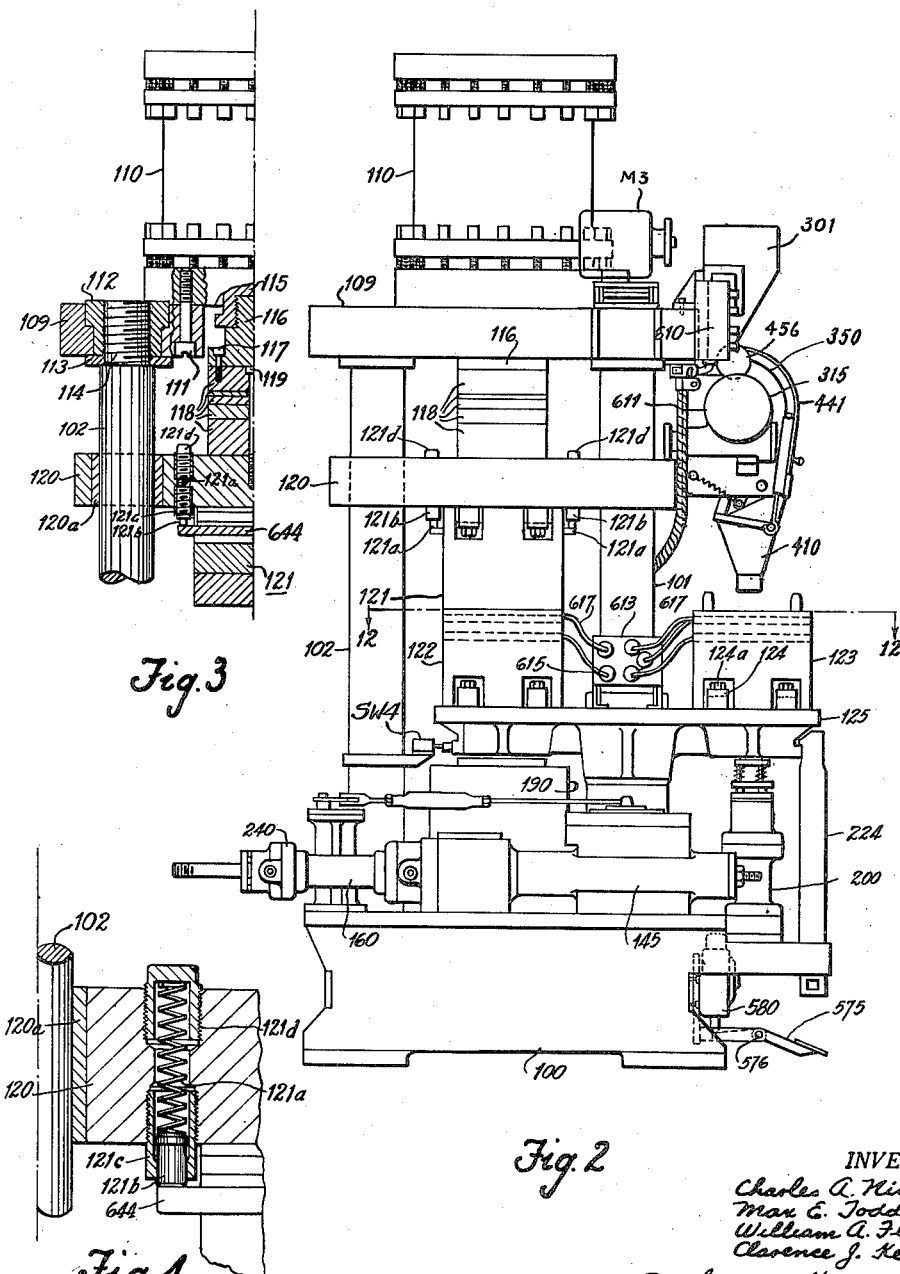

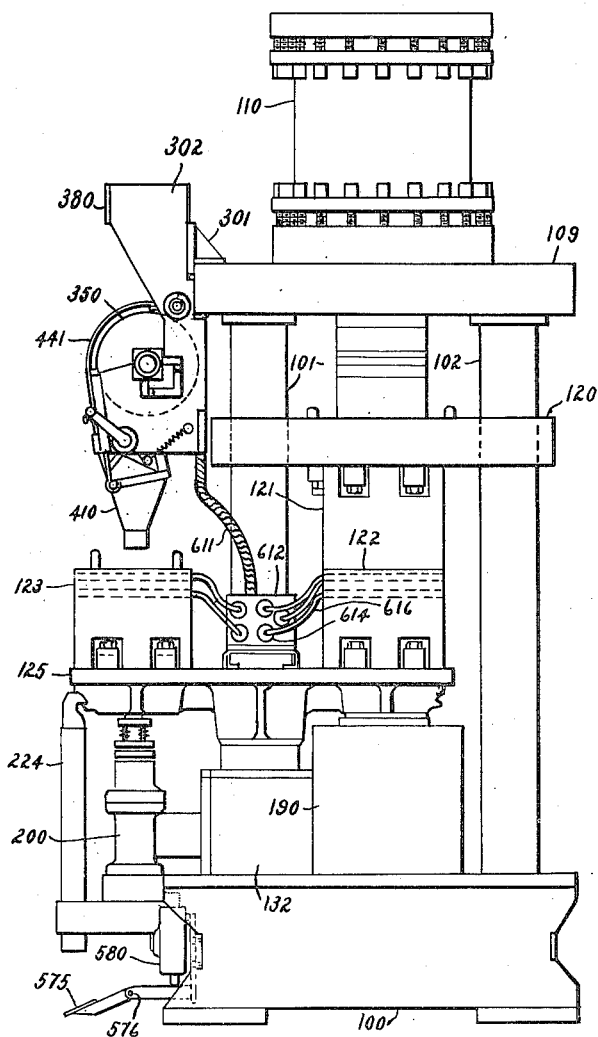

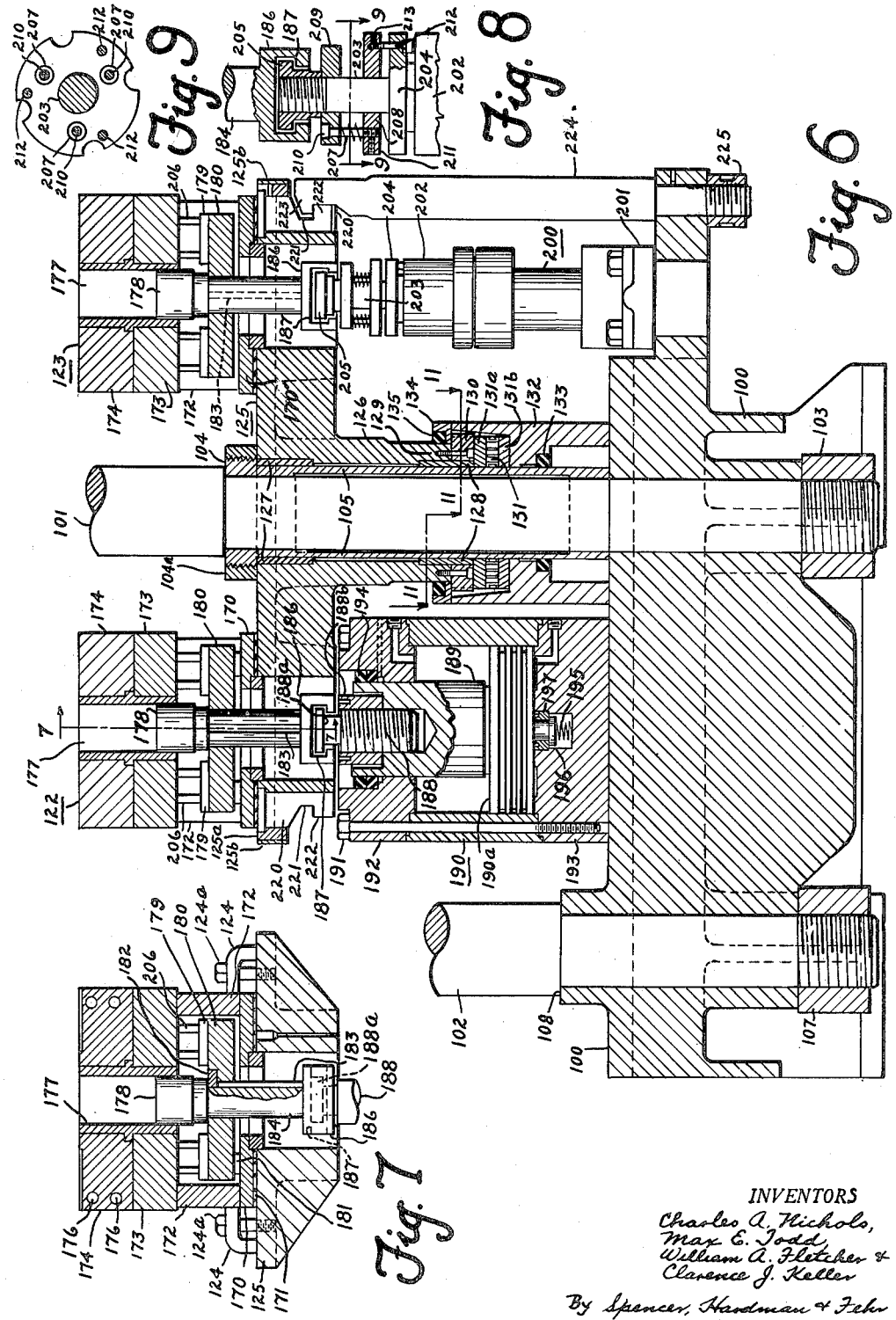

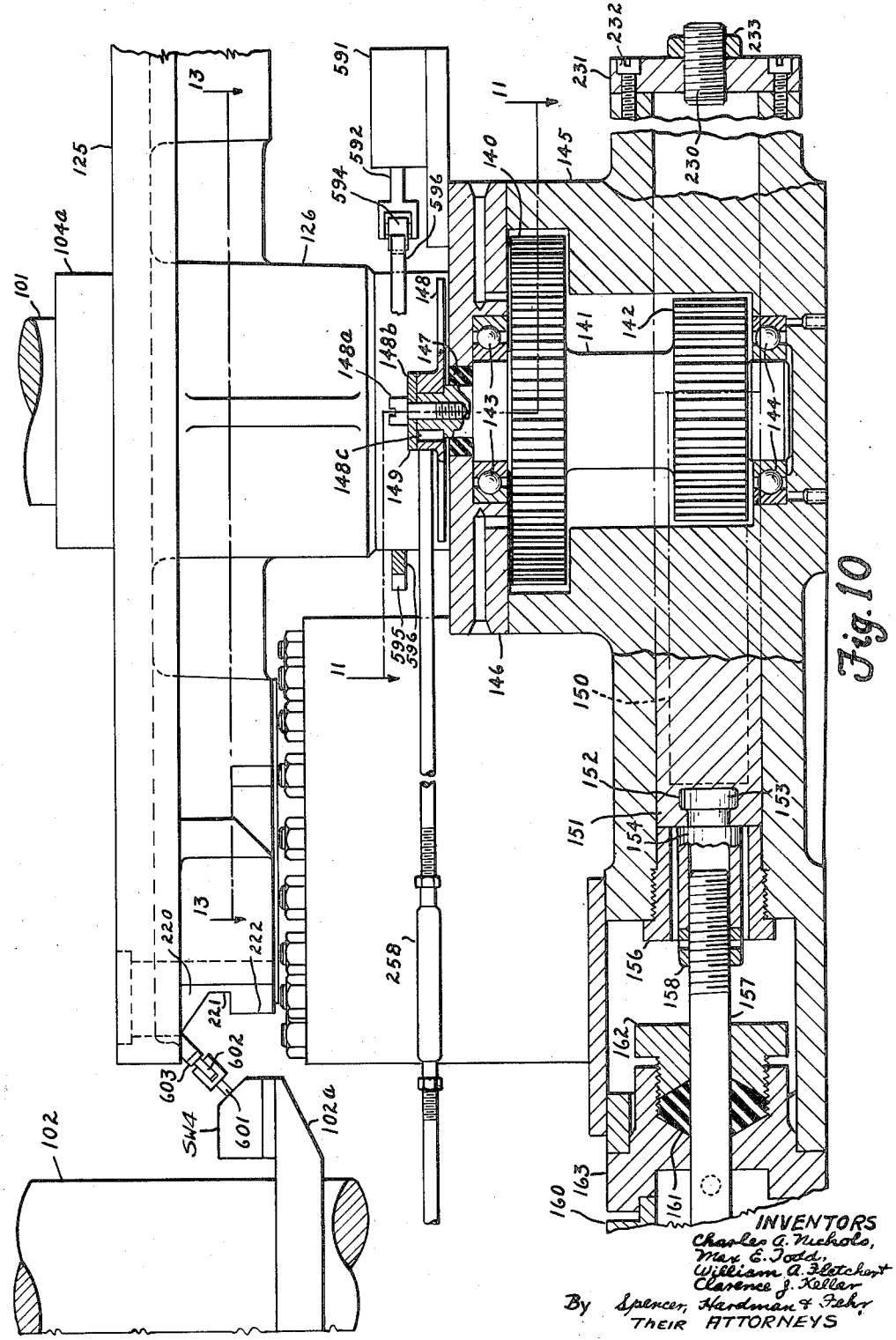

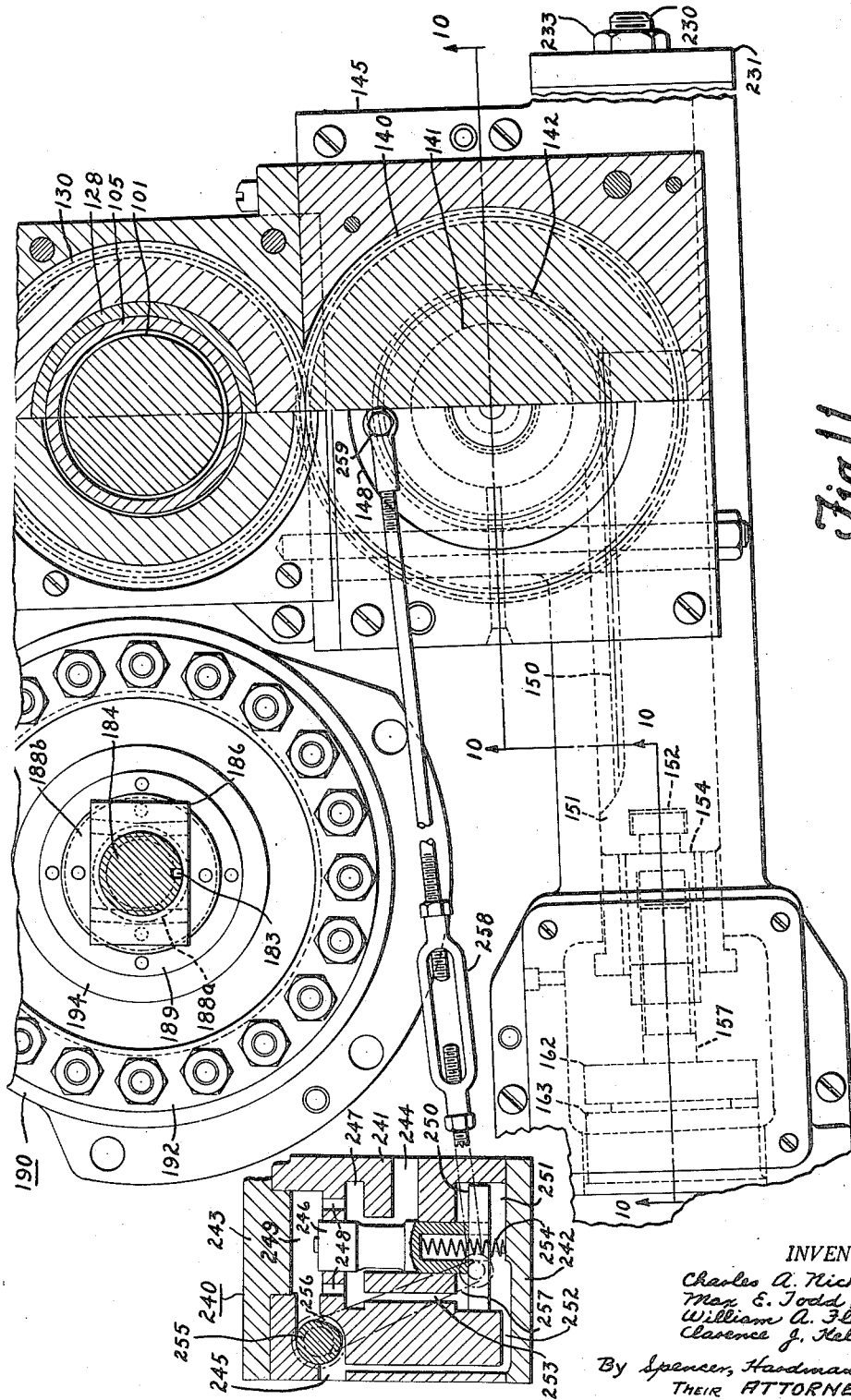

Nov. 28, 1950

C. A. NICHOLS ET AL 2,531,524

MOLDING MACHINE

Filed Sept. 17, 1947

INVENTORS
Charles A. Nichols,
Max E. Todd,
William A. Fletcher +
Clarence J. Keller By Spencer, Hardman + Fehr
THEIR ATTORNEYS

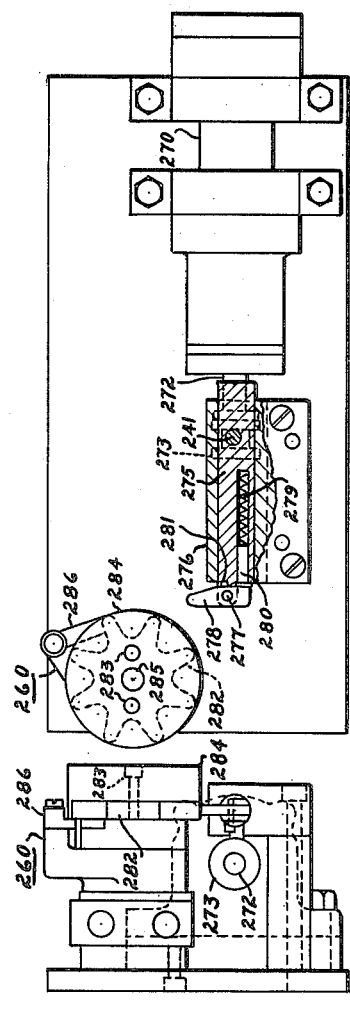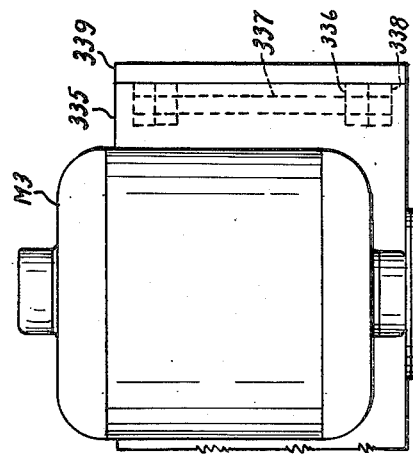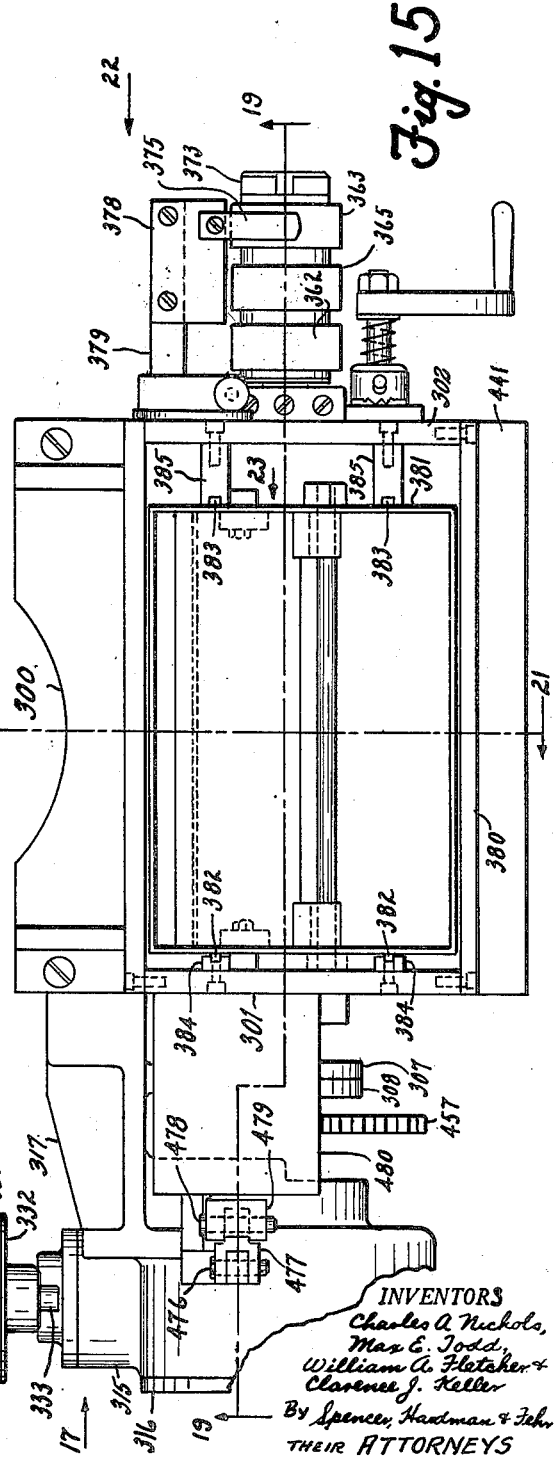

Nov. 28, 1950

C. A. NICHOLS ET AL 2,531,524

MOLDING MACHINE

Filed Sept. 17, 1947

INVENTORS
Charles A. Nichols
Max E. Todd
William A. Fletcher &
Clarence J. Keller By Spencer, Hardman & Fehr
THEIR ATTORNEYS

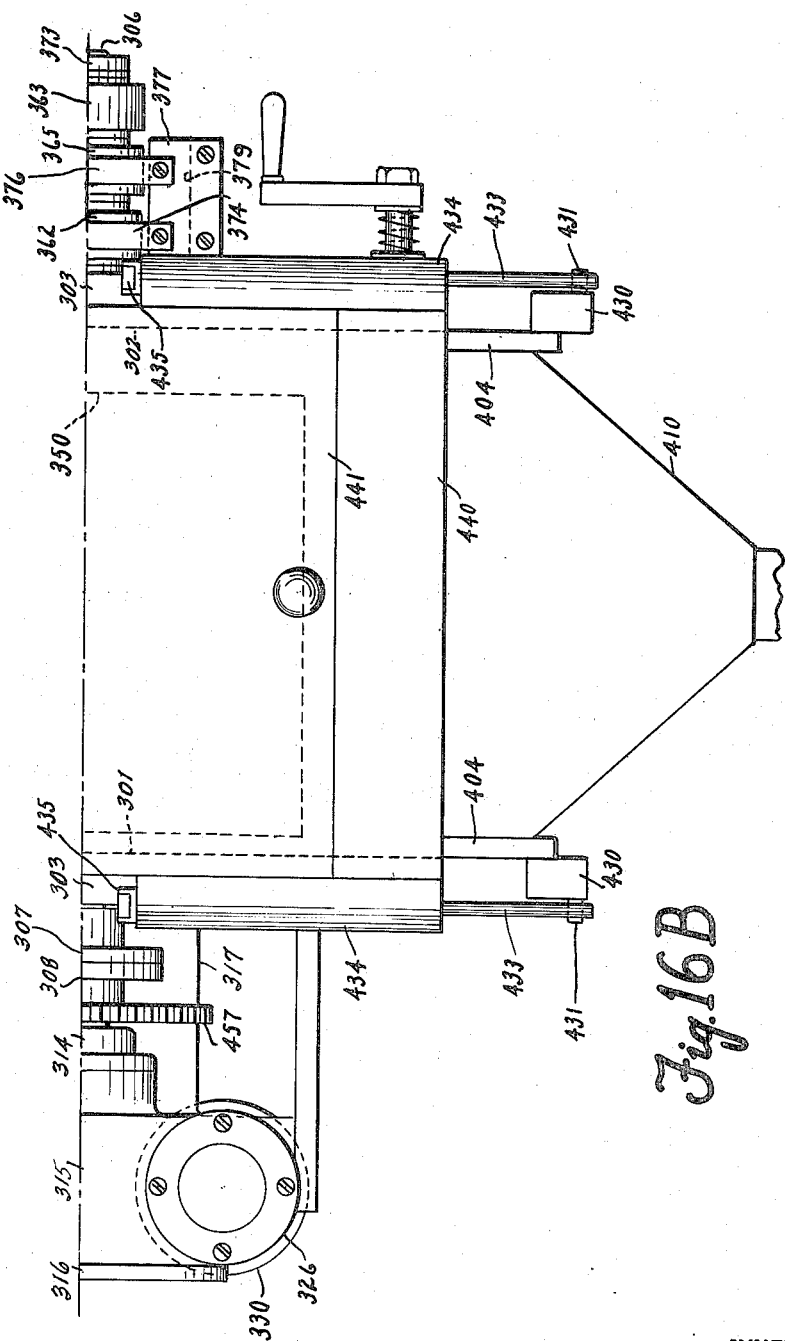

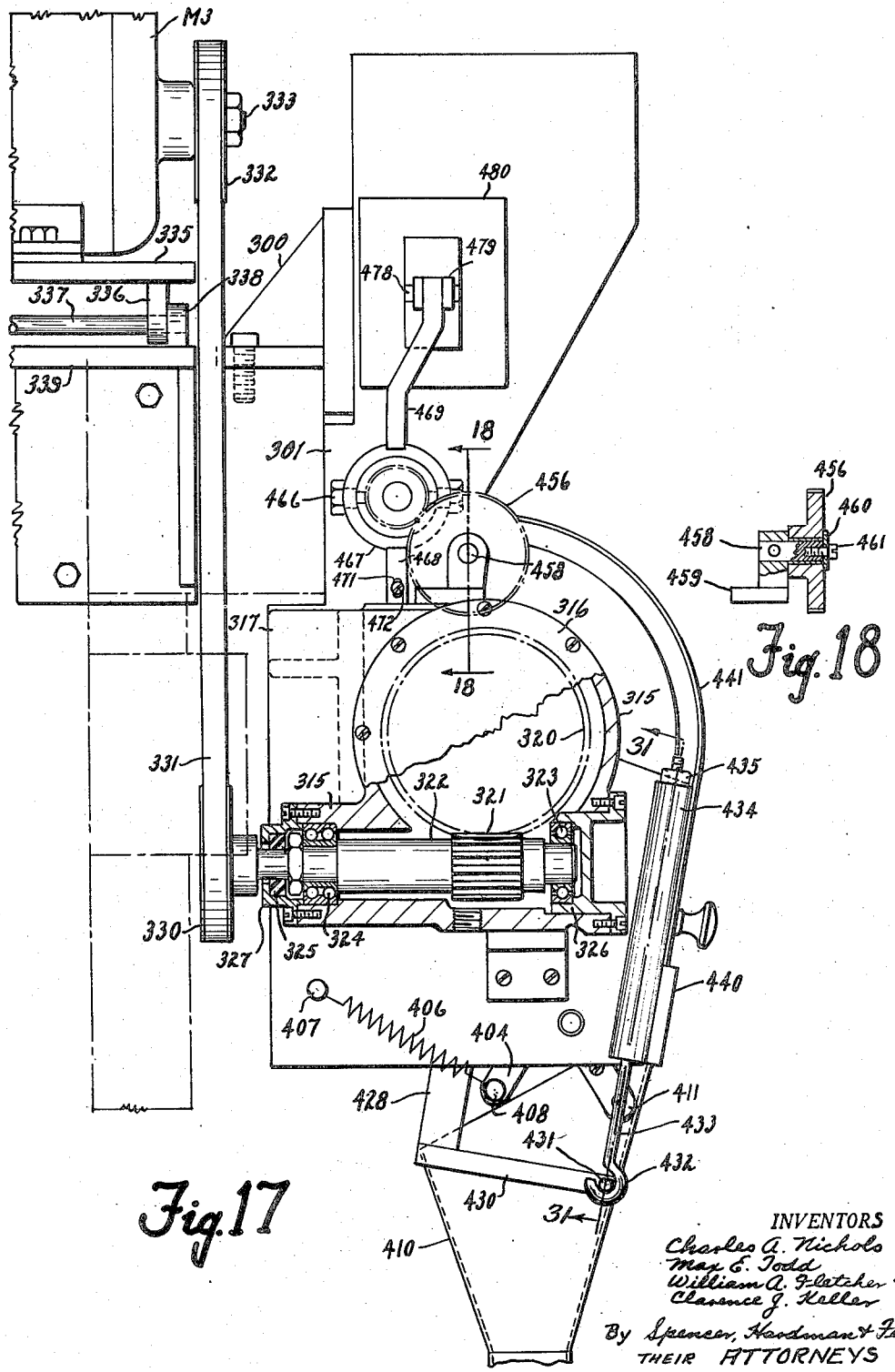

Nov. 28, 1950          C. A. NICHOLS ET AL          2,531,524
                           MOLDING MACHINE
Filed Sept. 17, 1947                          21 Sheets-Sheet 12
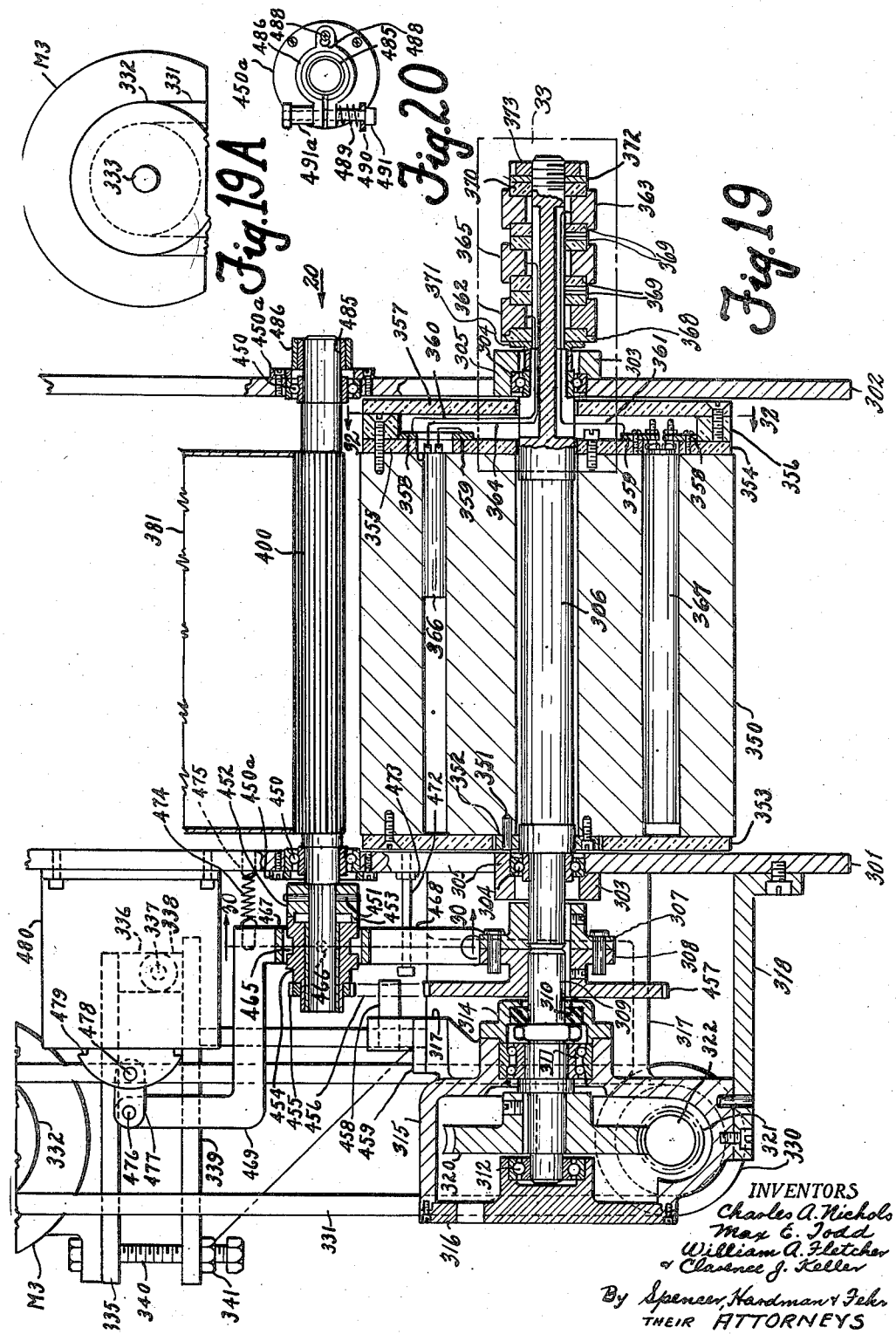
INVENTORS
Charles A. Nichols
Max E. Todd
William A. Fletcher
Clarence J. Keller
By Spencer, Hardman & Fehr
THEIR ATTORNEYS

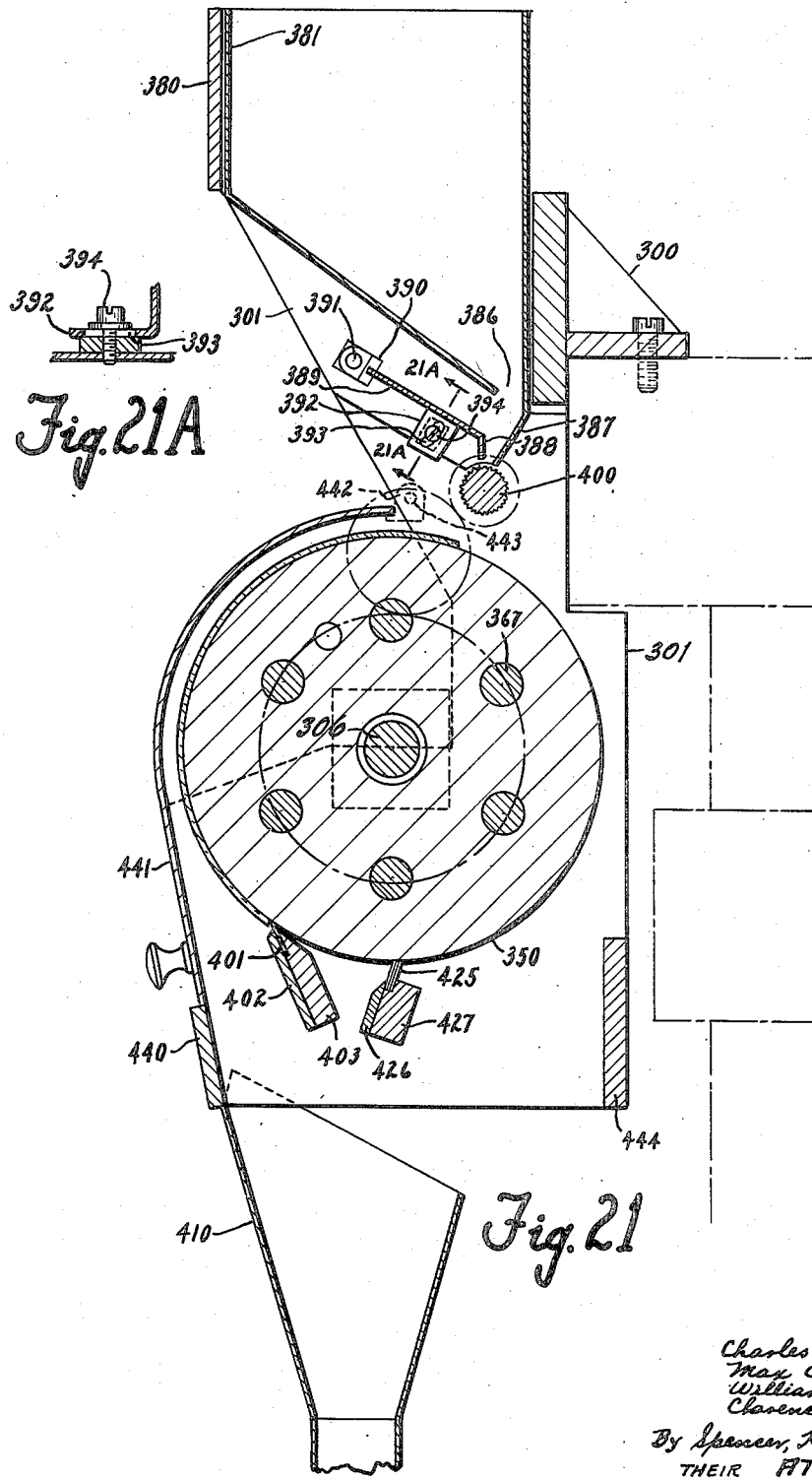

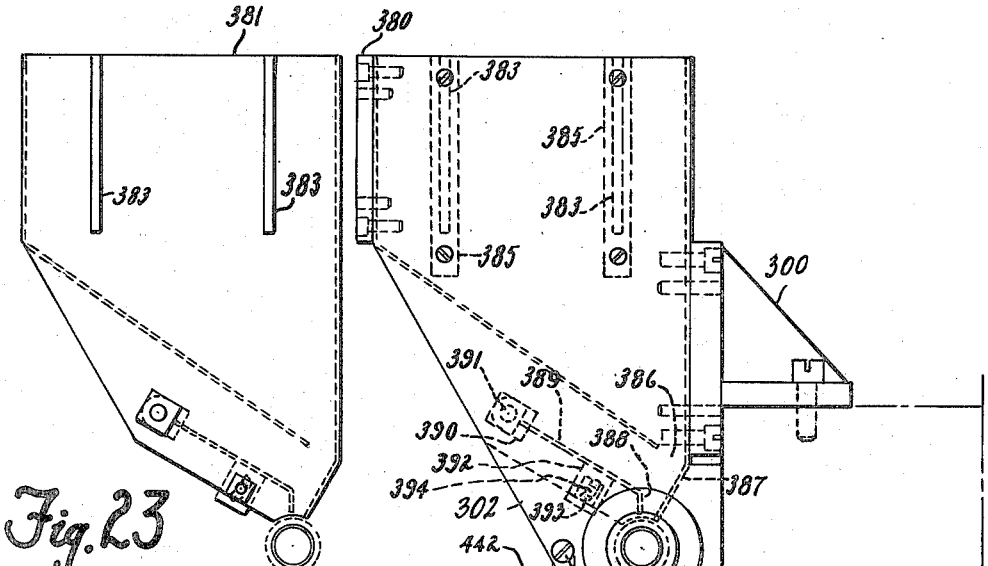
Fig. 23
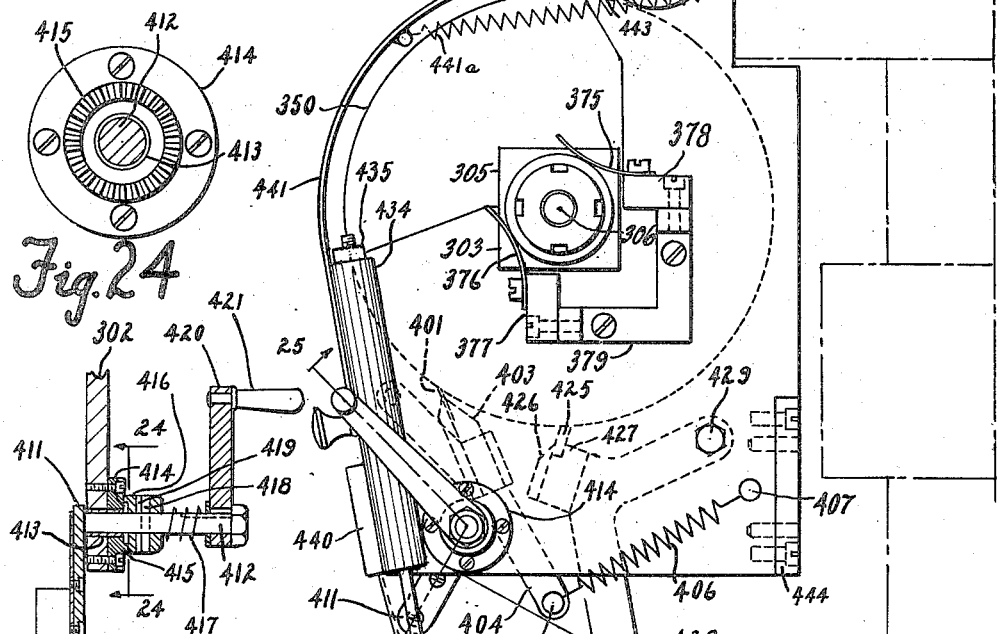
Fig. 24
Fig. 22
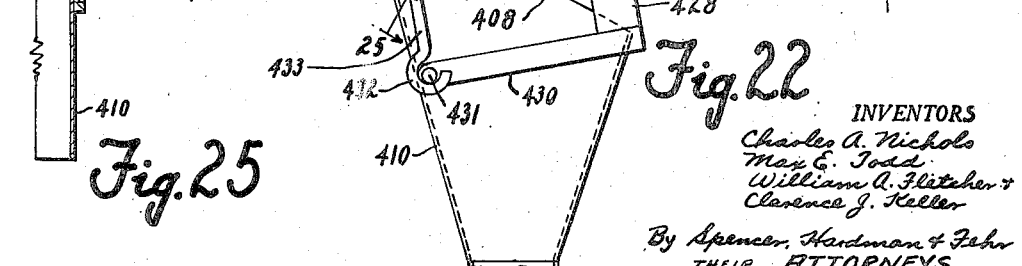
Fig. 25
INVENTORS
Charles A. Nichols
Max E. Todd
William A. Fletcher &
Clarence J. Keller
By Spencer, Hardman & Fehr
THEIR ATTORNEYS

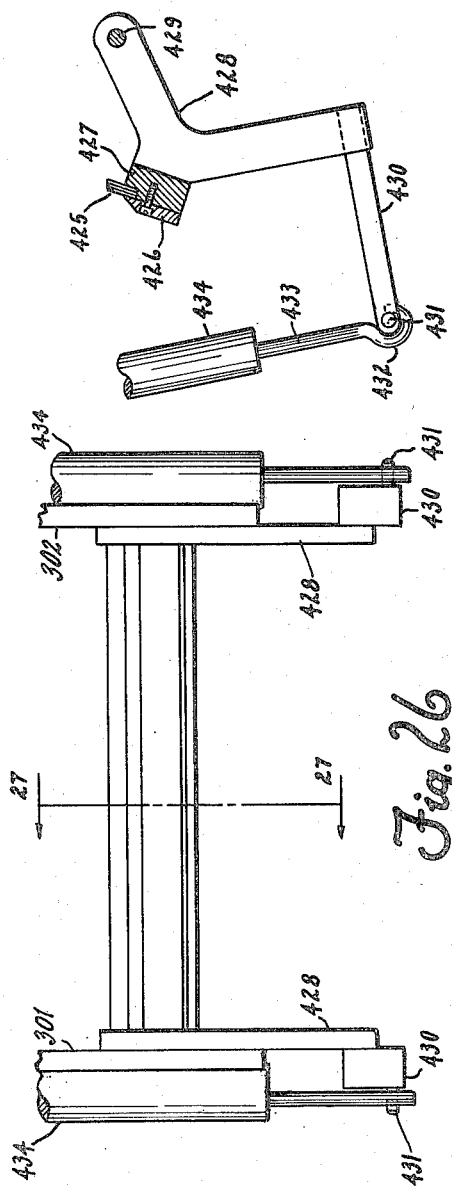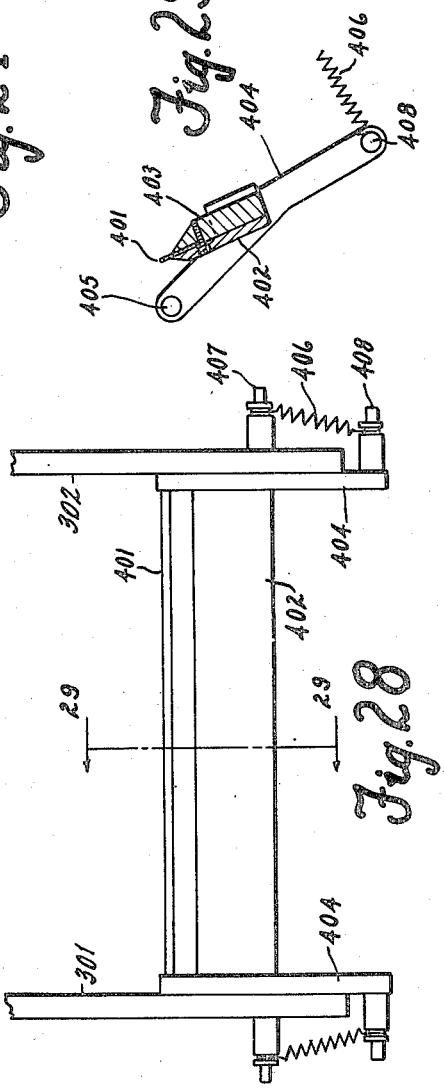

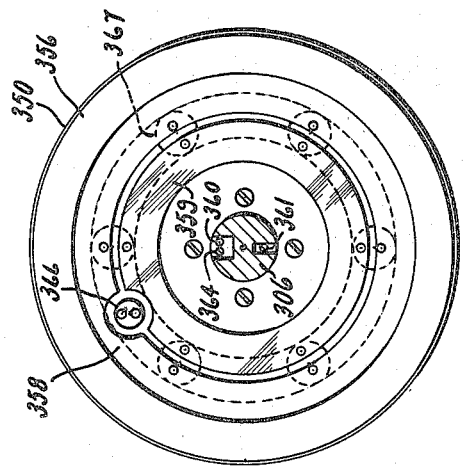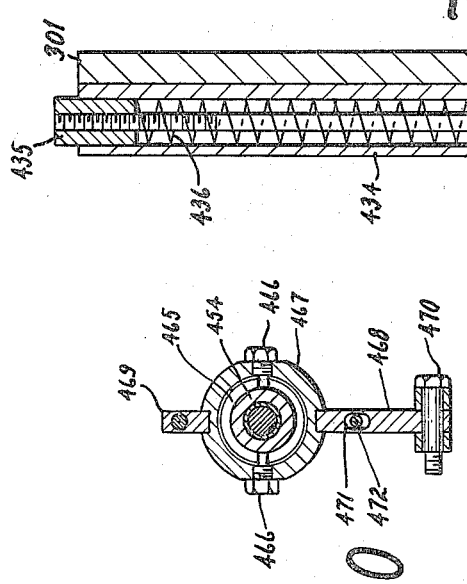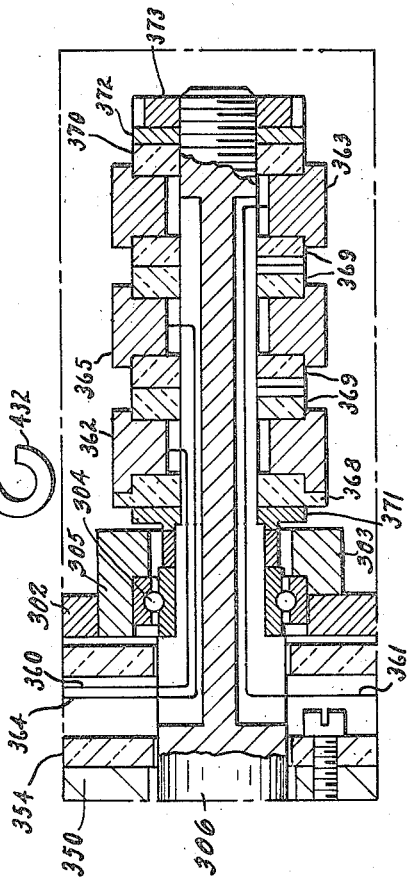

Nov. 28, 1950

C. A. NICHOLS ET AL 2,531,524

MOLDING MACHINE

Filed Sept. 17, 1947

INVENTORS
Charles A. Nichols,
Max E. Todd,
William A. Fletcher &
Clarence J. Keller
By Spencer, Hardman & Fehr
THEIR ATTORNEYS Nov. 28, 1950 — C. A. NICHOLS ET AL — 2,531,524
MOLDING MACHINE
Filed Sept. 17, 1947 — 21 Sheets-Sheet 18

INVENTORS
Charles A. Nichols, Max E. Todd
William A. Fletcher, Clarence J. Keller
By Spencer Hardman & Fehr, their attorneys

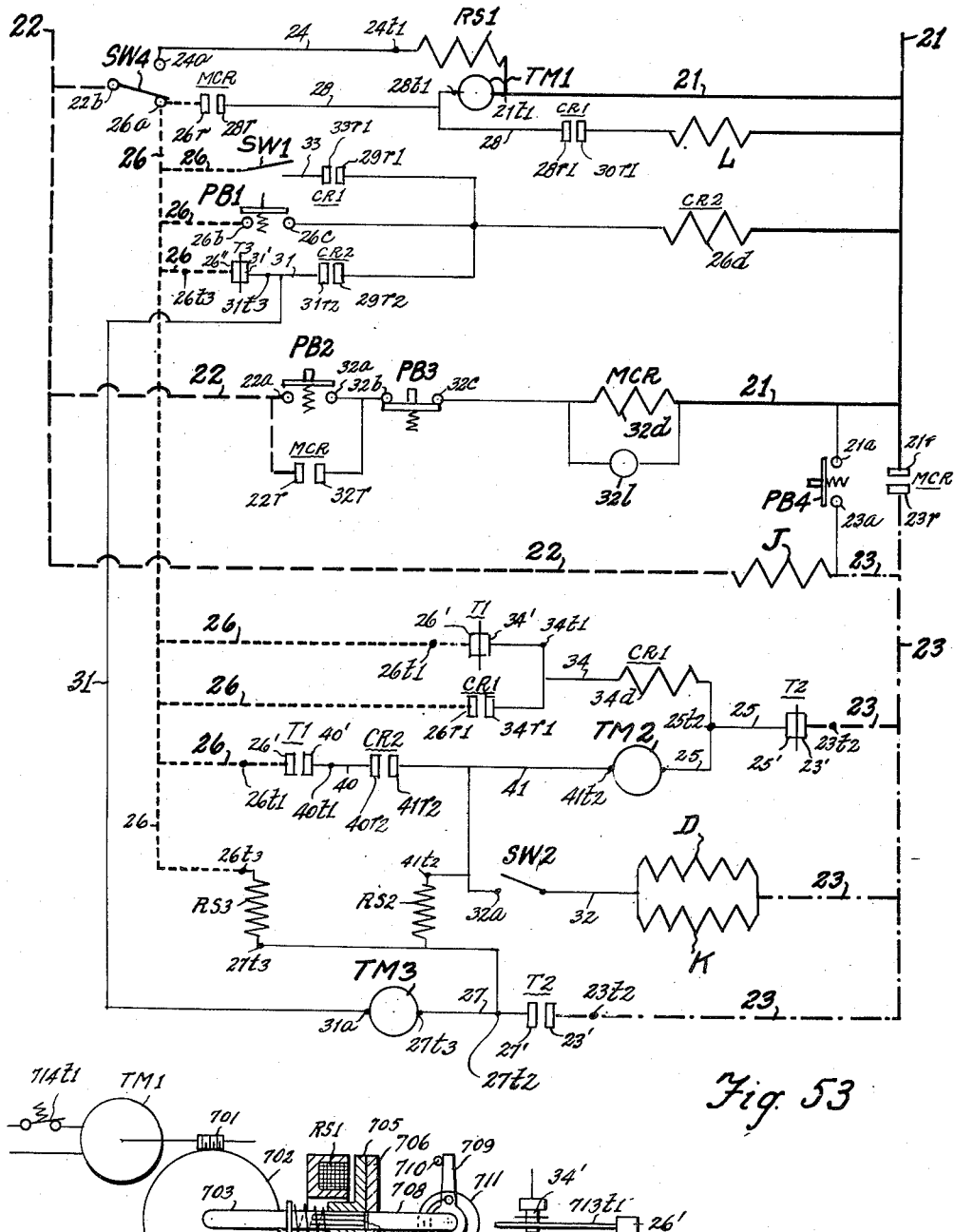

Patented Nov. 28, 1950

2,531,524

UNITED STATES PATENT OFFICE 2,531,524

MOLDING MACHINE

Charles A. Nichols, Max E. Todd, William A. Fletcher, and Clarence J. Keller, Anderson, Ind., assignors to General Motors Corporation, Detroit, Mich., a corporation of Delaware Application September 17, 1947, Serial No. 774,592

4 Claims. (Cl. 18—30)

This invention relates to the control of a hydraulically operated press for molding plastic materials and of apparatus for preheating a quantity of molding material which is delivered to the press. The apparatus is known as a doser and the duration of its operation, known as dosing time, determines the quantity of heated material delivered to the press.

An object of the invention is to control curing time of the material in the press independently of dosing time and to control dosing time independently of curing time. In the disclosed embodiment of the invention, this object is accomplished by a molding machine comprising a conveyor having a plurality of molds each having a compression chamber for receiving molding material and a ram in the compression chamber and movable to locate one mold at a loading station and another mold at a work station, a mold at the work station adapted to engage with the mold located by the conveyor at the work station, a control solenoid, an hydraulic system under control of the solenoid and operable automatically, when the solenoid is energized, to effect in sequence the closing of the molds, the movement of a ram to inject material in the compression chamber of a mold into mold cavities, and operable automatically, when the solenoid is deenergized, to effect in sequence retraction of the ram, separation of the molds and indexing of the conveyor, a doser having provisions for heating molding material and delivering it to the compression chamber of the mold at the loading station, a first timer rendered operative in response to completion of indexing, a second timer rendered operative in response to timing-out of the first timer, a third timer rendered operative in response to timing-out of the second timer and timing-out prior to the next indexing operation, solenoid control means responsive to completion of indexing for effecting energization of the solenoid and responsive to timing-out of the second timer for effecting deenergization of the solenoid and doser control means responsive to timing-out of the first timer for rendering the doser operative and responsive to timing-out of the third timer for rendering the doser inoperative Further objects and advantages of the present invention will be apparent from the following description, reference being had to the accompanying drawings wherein a preferred embodiment of the present invention is clearly shown.

In the drawings:

Fig. 2 is a side elevation looking in the direction of arrow 2 of Fig. 1.

Fig. 3 is a fragmentary view partly in side elevation and partly in section, the section being taken on the line 3—3 of Fig. 1.

Fig. 4 is a fragmentary sectional view showing a portion of Fig. 3 on a larger scale.

Fig. 5 is a side elevation looking in the direction of arrow 5 of Fig. 1.

Fig. 6 is a fragmentary sectional view on the line 6—6 of Fig. 1.

Fig. 7 is a fragmentary sectional view on the line 7—7 of Fig. 6.

Fig. 8 is a fragmentary view partly in longitudinal section of adjacent parts shown in Fig. 6.

Fig. 9 is a sectional view on the line 9—9 of Fig. 8.

Fig. 10 is a fragmentary side elevation partly in section, the section being on the line 10—10 of Fig. 11.

Fig. 11 is a fragmentary sectional view taken principally on the line 11—11 of Fig. 6 and on line 11—11 of Fig. 10 and includes a sectional view of a valve 240, the side elevation of which is shown in Fig. 2.

Figure 1:
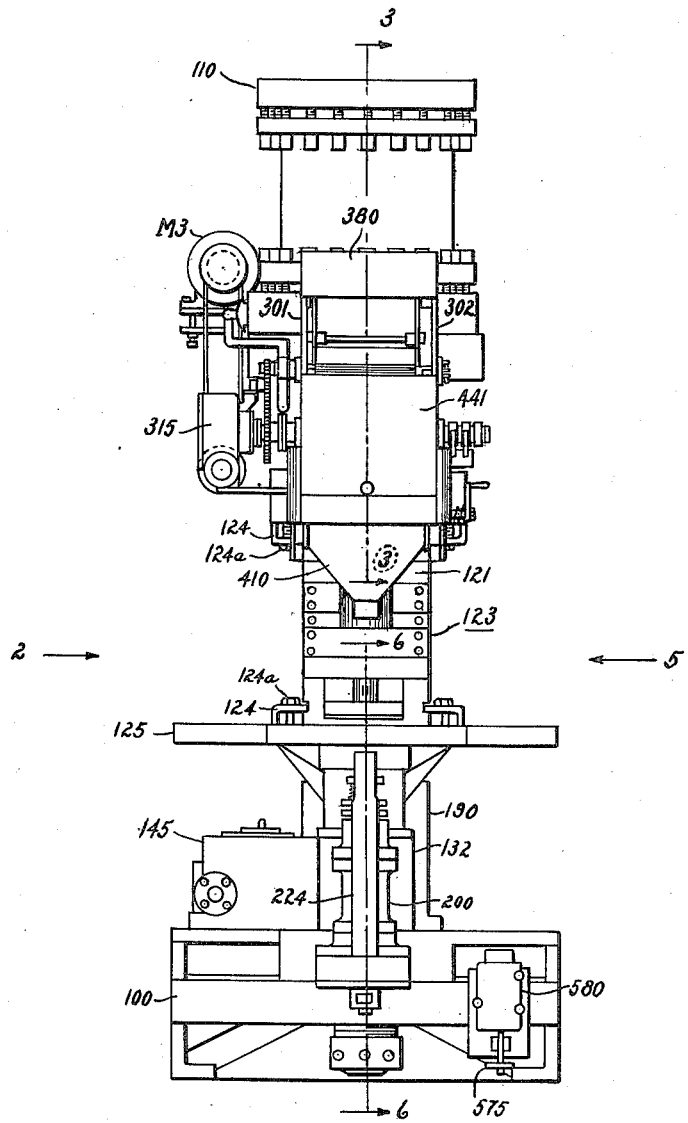
Fig. 1 is a front elevation of the molding machine and material handling apparatus.
Figures 12, 13:
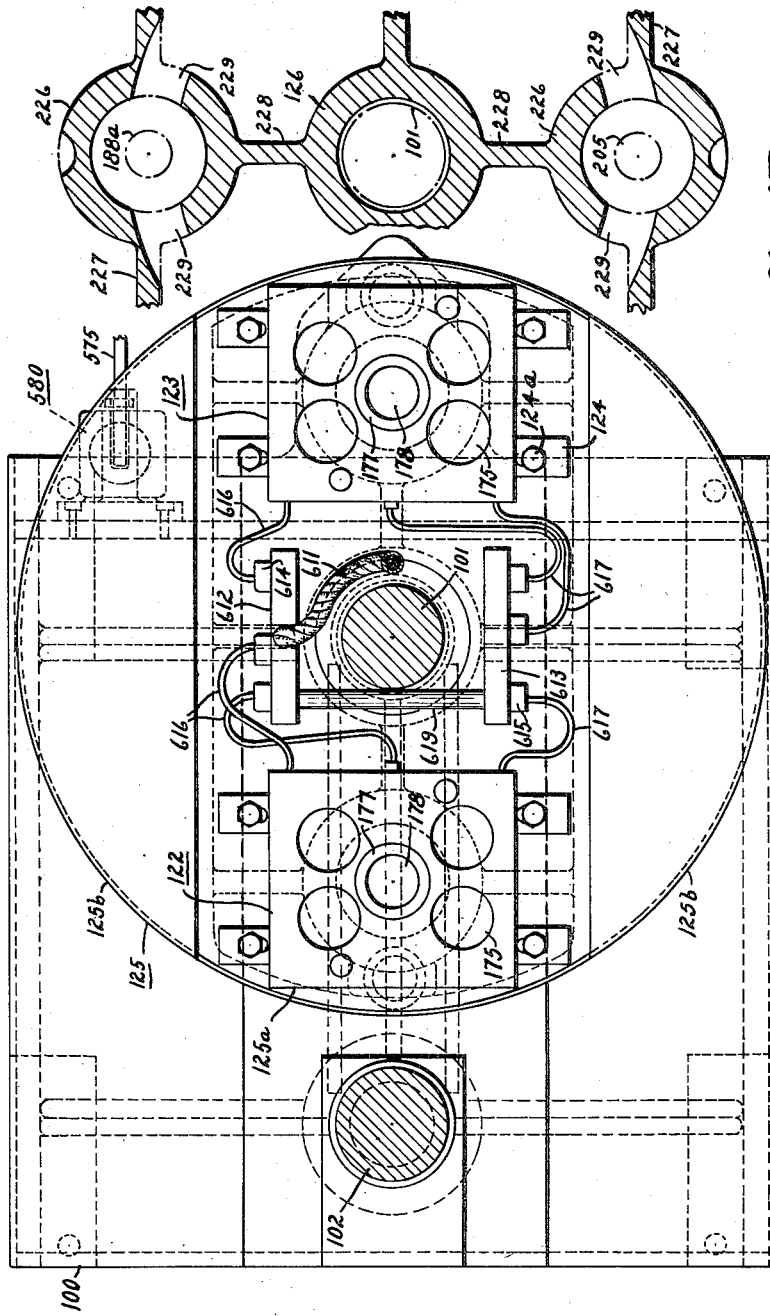

Fig. 12 is a fragmentary sectional view on line 12—12 of Fig. 2.

Fig. 13 is a fragmentary sectional view on line 13—13 of Fig. 10.

Fig. 14 is a side view partly in section of an assembly of an hydraulic circuit reversing valve and means for operating it.

Fig. 14A is a view taken in the direction of arrow 14A of Fig. 14.

Fig. 15 is a plan view of the preheating apparatus.

Figs. 16A and 16B together form a front view of the preheating apparatus.

Fig. 17 is a side view looking in the direction of the arrow 17 of Fig. 15.

Fig. 18 is a fragmentary sectional view on line 18—18 of Fig. 17.

Figs. 19 and 19A together form a sectional view on line 19—19 of Fig. 15.

Fig. 20 is a fragmentary view in the direction of arrow 20 of Fig. 19.

Fig. 21 is a sectional view on line 21—21 of Fig. 15.

Fig. 21A is a sectional view on line 21A—21A of Fig. 21.

Fig. 22 is a side view looking in the direction of arrow 22 of Fig. 15.

Fig. 23 is a side view of a hopper looking in the direction of arrow 23 of Fig. 16A.

Fig. 24 is a fragmentary sectional view on line 24—24 of Fig. 25.

Fig. 25 is a fragmentary sectional view on the line 25—25 of Fig. 22.

Fig. 26 is a front view of the roller cleaner assembly.

Fig. 27 is a sectional view on line 27—27 of Fig. 26.

Fig. 28 is a front view of the roller scraper assembly.

Fig. 29 is a sectional view on line 29—29 of Fig. 28.

Fig. 30 is a fragmentary sectional view on line 30—30 of Fig. 19.

Fig. 31 is a fragmentary sectional view on line 31—31 of Fig. 16B.

Fig. 32 is a fragmentary sectional view in line 32—32 of Fig. 19.

Fig. 33 is a view of the brush rigging.

Figure 34:
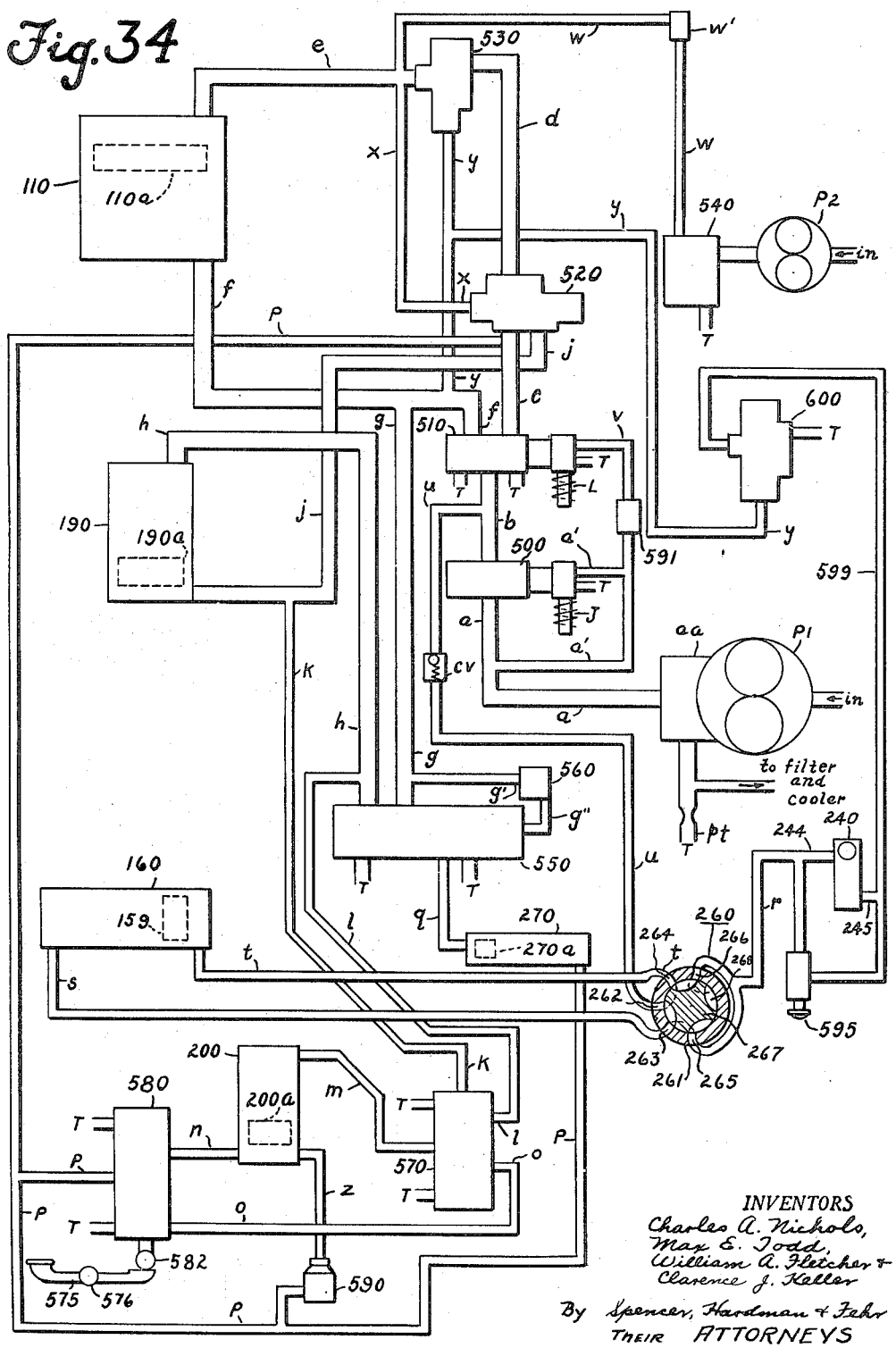

Fig. 34 is a diagram of the hydraulic system of the apparatus.

Figs. 35 to 50 are diagrammatic sectional views of various valves used in the hydraulic system.

Figure 51:
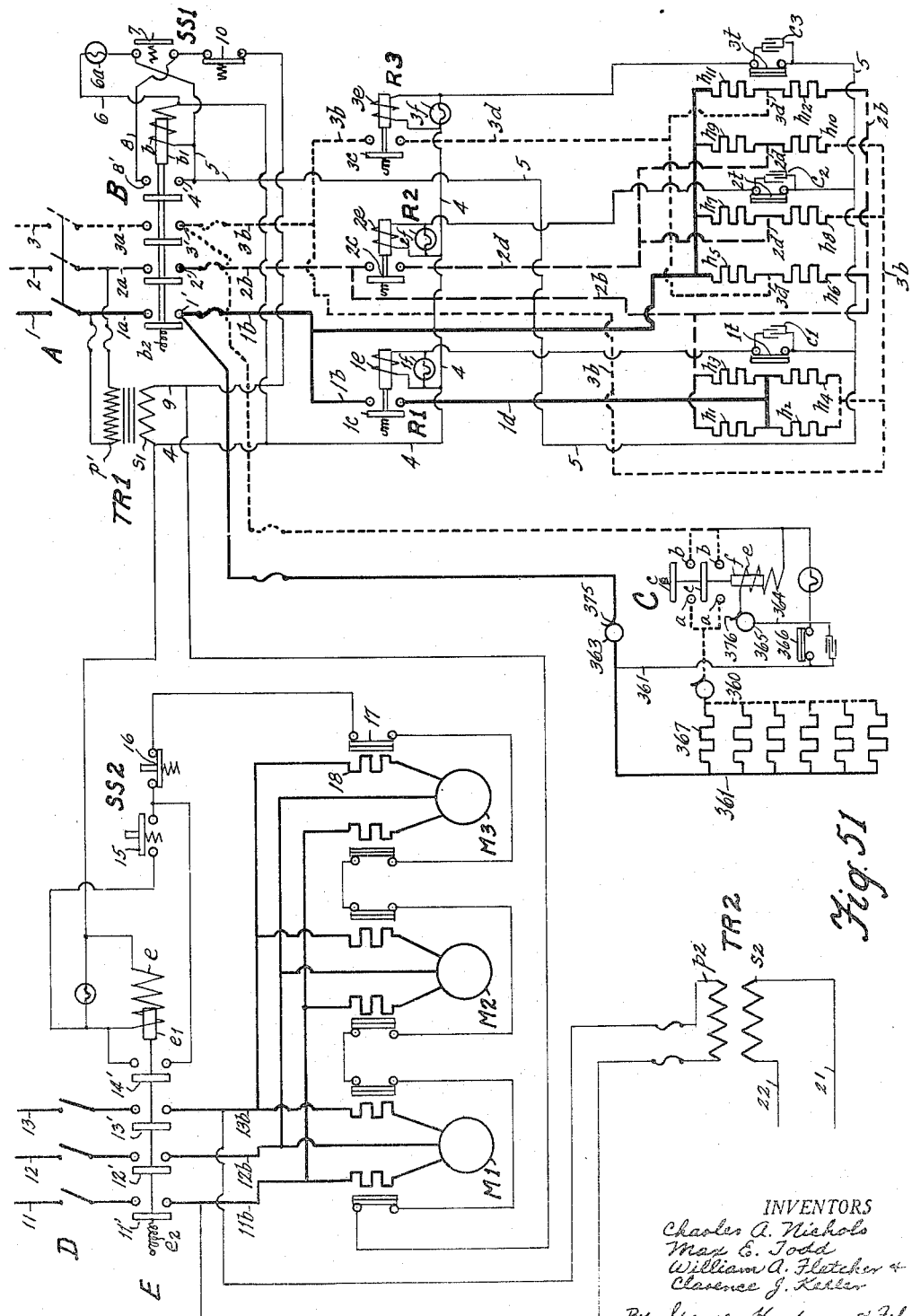

Fig. 51 is a wiring diagram of the motor and heater controls.

Figure 52:
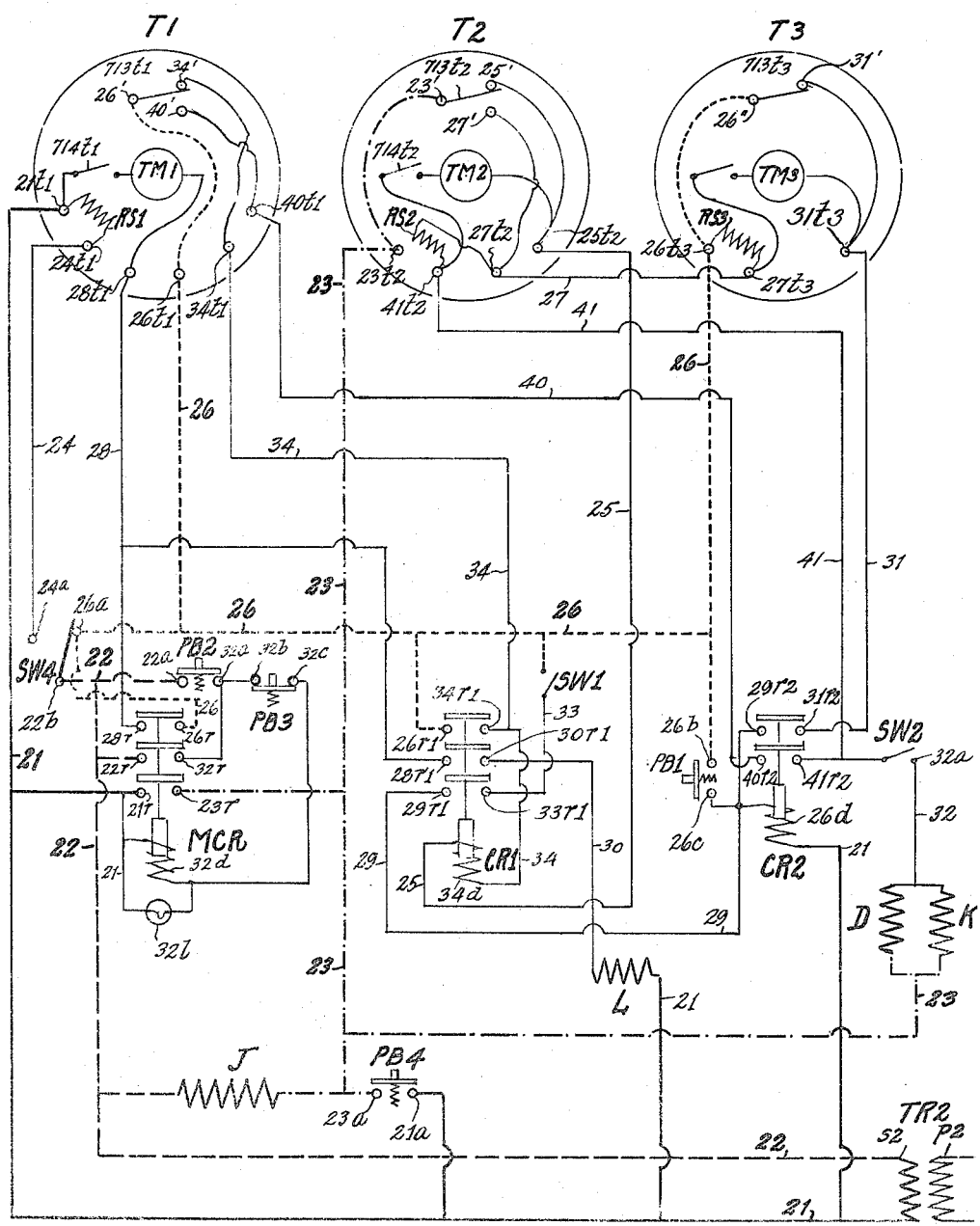

Fig. 52 is a conventional wiring diagram of the cure timer controls.

Fig. 53 is a non-conventional, explanatory diagram of the cure timer controls shown in Fig. 52.

Fig. 54 is a diagram of a cure timer.

Referring chiefly to Figs. 2 and 6, the machine comprises a base 100 supporting posts 101 and 102. Post 101 receives a nut 103 (Fig. 6) which when tightened draws a shoulder 104 of the post 101 (Fig. 6) against a tube 105 and forces the latter against an upper surface of the base 100. The tightening of a nut 107 on the post 102 draws a shoulder 108 of the post against an upper surface of the base 100.

The posts 101 and 102 support a bar 109 which supports a cylinder 110 attached to the bar 109 by screws 111 as shown in Fig. 3. Each of the posts 101 and 102 is attached to the bar 109 in the manner shown in Fig. 3. The threaded end of each post receives a nut 112 received by a counterbore in the bar. When the nut 112 is tightened, the bar 109 is clamped against a washer 113 which, in turn, is clamped against a shoulder 114 of the post. The cylinder 110 receives a piston 110a (Fig. 34) attached to a rod 115 (Fig. 3) threadedly connected with a coupling member 116 by screws 117 attached to the upper one of a plurality of spacers 118 of different thicknesses. Screws 119 attach all of these spacers to a bar 120 which supports an upper die 121. Bar 120 is provided with bearings 120a which slide on the posts 101 and 102. The upper die 121 is adapted to engage either one of two lower dies 122, 123 mounted on an oscillatable table 125. These dies are secured to their respective supports by angle bars 124 and screws 124a.

Referring to Fig. 6, the table 125 has a central tubular hub 126 provided with bearing bushings 127 by which the hub is journaled on the tube 105. To the lower end of hub 126, a gear 130 is attached by screws 129. Gear 130 rests upon the upper race 131a of a roller thrust bearing 131, the lower race 131b of which rests upon a surface of a frame 132 through which the tube 105 extends. A packing ring 133 carried by the frame 132 seals the gap between the hub and the frame. The hub extends through a plate 134 which is attached to the upper surface of the frame 132 and which carries a packing ring 135 which seals the gap between the hub 126 and the ring 134.

Referring to Fig. 11, it will be seen that the gear 130 is driven by a gear 140 which, as shown in Fig. 10, is integral with a shaft 141 integrals with a gear 142. Shaft 141 is journaled in ball bearings 143 and 144 provided by frame 145 which houses the gears and the mechanism for driving them. Frame 145 supports a cover 146 into which the bearing 143 is recessed. Cover 146 supports a packing ring 147 for sealing the gap between the shaft 141 and the cover. Shaft 141 drives a disc 148 connected therewith by key 148c and a screw 148a which retains a washer 148b. The function of the crank disc 148 will be described later.

As shown in Figs. 10 and 11, the gear 142 meshes with a rack 150 integral with a bar 151 which is guided by the frame 145. Bar 151 has a T-slot 152 which receives a T-head 153 of a nut 154 extending through a hole in a stop bushing 156 threaded into the frame 145. Nut 154 is threadedly connected with a rod 157 in the desired position of adjustment which is retained by lock nut 158. Rod 157 is attached to a piston 159 (Fig. 34) in a cylinder 160 (Fig. 2). Rod 157 slides through a packing 161 retained by a packing gland 162 threaded into the head end 163 of the cylinder 160 which is attached to the frame 145. The movement of the piston 159 of cylinder 160 in one direction causes the table 125 to rotate 180° in one direction, and movement of the piston in the opposite direction causes the table to rotate 180° in the opposite direction. Rotation of the table is determined by movement of bar 151 (Fig. 10) which, at the left end of its travel, strikes the stop bushing 156, and which, at the right end of its travel, strikes a screw 230 threaded into a cover block 231 attached by screws 232 to frame 145. A nut 233 secures the screw 230 in the desired position of adjustment. These movements of table 125 causes a lower die, such as 122, to be located under the upper die 121, while the other lower die 123 is located in a position for unloading the molded parts and for reloading the die with inserts, when required, and with molding powder which has been preheated in a manner to be described.

As shown in Fig. 6, each of the lower dies 122, 123 comprises a base 170, supported above the table 125 by a spacer 171 of a material having low heat conductivity, and secured thereon by the angle clamps 124 and screws 124a. The base 170 supports two bars 172 which, in turn, support plates 173 and 174 providing cavities 175 for receiving die blocks such as shown in copending application, Serial No. 692,274, filed August 22, 1946 now Patent No. 2,523,137. Plate 174 provides holes 176 for receiving certain one of the heating elements $h_1$ to $h_{12}$ shown diagrammatically in Fig. 51 to be described. The plates 173 and 174 support a compression cylinder 177 which receives a compression piston 178 which extends through a plate 180 supporting ejector pin plates 179 and normally rotating on buttons 181 carried by base 170. The plate 180 provides a recess for a key 182 welded into plate 180. Key 182 is received by a longitudinal groove 183 in the rod 184 attached to the piston 178 and joining the piston at a shoulder 185 which, in the lower position of the piston, rests upon the plate 180. Since the plates 179 and 180 are aligned by pins 662, rotation thereof about the axis of cylinder 177 is only slightly permissible. Since the rod 183 is longitudinally splined to the plate 180, it can rotate but slightly.

The lower end of rod 184 is integral with a head 186 having a T-slot 187 which, when mold 122 or 123 is under mold 121, embraces the T-head 188a of a screw 188 which is attached to the rod 189 of a piston 190a of a cylinder 190 attached to the base 100. The cylinder 190 is attached by screws 191 to its ends 192 and 193. End 192 carries packing rings 194 through which the rod 189a passes. The bottom end 193 provides a recess for a spring 195 which urges upwardly a plunger 196 retained by a screw plug 197 threaded into the end 193. When there is no fluid pressure above the piston 190a, the plunger 196 elevates the piston slightly above the end 193 in order that there will be clearance between the T-head 188a and the surfaces of the T-slot 187 of the head 186 of rod 184. This clearance should exist when the shoulder of the plunger 196 is positioned by the spring 195 against the plug 197. When there is fluid pressure above the piston 190a, the piston will bottom on the end 193 and the head 188a of the plug will pull down on the head 186 of rod 184 and cause the plate 180 to bottom on the buttons 181. In order that this may occur, some adjustment of the plug 188 relative to the piston 190a may be required. For this reason, the plug 188 is screw threaded into the rod 189 and can be adjusted in order to obtain the desired effect and then locked in adjusted position by lock nut 188b. When the piston 190a bottoms on the cylinder at 193, the flange of the plunger 196 is spaced slightly below the plug 197. When fluid pressure above the piston 189 is relieved, the spring 195 pushes the plunger 196 up to raise the piston 190a and hence the T-head 188a slightly above the flanges of the T-slot 187 in head 186 to provide clearance so that the table 125 can be rotated without any frictional engagement between the parts 188a and 186.

The function of the cylinder 110 (Fig. 2) is to contain the pressure fluid which raises and lowers its piston 110a (Fig. 34) which causes the upper die 121 to be pressed firmly against a lower die before plastic material is forced into the mold cavities. The function of the cylinder 190 is to contain the pressure fluid which effects the movements of the piston 190a which, through its connection with a compression ram 178, causes plastic material to be compressed in the cylinder 177 and to flow therefrom through runners to the die cavities. This will be described in detail later. The upper die 121 is maintained forcibly against a lower die while plastic material therein is being cured under pressure and heat supplied by the heating elements within the dies. During curing the piston 178 remains up. In a manner to be described later, after the curing cycle, the piston 178 moves down under the action of fluid pressure above the piston 190a and the die 121 moves up under the action of pressure fluid beneath the piston 110a. After the curing cycle, the die beneath the upper die 121 is moved by rotation of the table 125 into a position for unloading and reloading; and it is replaced by a loaded lower die.

Fig. 6 shows a die 123 at the loading station. At this station, the molded material is ejected by means including an ejection cylinder 200 containing a piston 200a (Fig. 34). Cylinder 200 is attached to an end 201 attached to the base 100 and attached to an upper head end 202 through which the rod 203 (connected with piston 200a) passes. Rod 203 passes through packing retained by a packing gland member 204. The upper end of the rod 203 is threadedly connected with a T-head 205 which, like the T-head 188a, previously described, is adapted to be received by the T-slot of the head 186 of compression piston rod 184. When pressure fluid is admitted below the piston 200a, it rises to cause the head 186 to move upwardly. The stroke of the piston 200a is such that the head 186 will engage the plate 180 and cause it to move upwardly thereby effecting upward movement of ejection pins 206 attached to plates 179 to force the molded work from the lower die to such position that it can be easily removed by the operator, who then cleans the die cavities by compressed air and other means and then reloads the mold with inserts as required. The relation of the pins 206 to the work is shown in application, Serial #692,274 referred to.

After a lower die is prepared for charge of the molding powder, pressure fluid is admitted to the upper side of piston 200a to cause the rod 203 to move downwardly, its head 205 being engaged with the flanges of the head 186 during the downward movement to return the compression piston 178 to lowest position and to cause descent of the plate 180 upon the buttons 181. After this has been done, pressure fluid above the piston 200a is relieved as well as below to permit a slight elevation of the head 205 in order to provide clearance between head 205 and the head 186. This slight raising of the head 205 is effected by springs 207 which are confined under compression by the plate 208 and a plate 209 urged upwardly by these springs against the lower edge of the head 205. Each spring 207 surrounds a screw 210 whose head is received in a counterbore in the plate 209 and whose lower end threadedly engages the plate 208 and is clamped in adjusted position by clamping screw 211. Plate 208 is threadedly engaged by a plurality of screws 212 clamped in adjusted position by clamp screws 213. Screws 212 pass through the flange of the packing gland 204 which is stationary. The heads of the screw 212 are received by counterbores in the under surface of said flange. The plates 208 and 209 are not fastened to the rod 203 so there can be relative movement. Screws 212 are so adjusted that their heads bottom on the upper end of the cylinder end 202. The screws 210 are so adjusted that the plate 209 engages the under sides of the heads of the screws 210 when the springs 207 have expanded sufficiently to provide clearance between the coupling members 205 and 186. When pressure fluid exists above the piston 200a to cause the rod 184 to move down as far as it will go, the head 205 will engage the lower flanges of the head 186 and the plate 209 will be pulled down to compress the springs 207 beyond their normal state of compression thereby forcing screws 212 down against cylinder end 202. Then there will be a slight clearance between the plate 209 and the under sides of the heads of screws 210. When pressure fluid is relieved above the piston 200a, the springs 207 can expand to take up this clearance and cause the plate 209 to move up to push the coupling head 205 up to cause it to clear the coupling head 186. Thus the table 125 can rotate without frictional engagement between the coupling heads 205 and 186.

When pressure is being applied by the die closing piston 110a to force the die 121 against the lower die beneath it, the left side of table 125 (Fig. 6) is deflected slightly to take up the small clearance between it and the cylinder end 192. Thus the force of the upper die upon the lower die is transmitted to the base 100 through parts of cylinder 190. When the piston of cylinder 200 is forced up to eject the molded parts from the lower die, ram coupling head 186 strikes plate 180 to lift the plates 179 carrying the ejector pins 206 and plates 179 engage die plate 173. This tends to deflect the right end (Fig. 6) of the table 125 upwardly. To reduce the strain on the table and its center bearings, it is desirable to transmit to the base 100 the force transmitted from the piston of cylinder 200 to the die at the loading station. For this purpose, each end of the table is provided with a large pin 220 having a notch 221 defining a hook 222 which is adapted to be engaged by hook 223 provided by post 224 attached to the base by a nut 225. While the lower die at the loading station is not being forced up by fluid pressure in cylinder 200, there will be clearance between the hooks 222 and 223 so that the table 125 can move freely without any frictional engagement between these hooks. When the pressure is applied from cylinder 200 to the die at the loading station, the clearance between parts 222 and 223 is taken up so that post 224 is placed under tension as it transmits to the base 100 at least a major portion of the force applied by fluid pressure in cylinder 200 to the die at the loading station. On account of the mass to be moved each time the table is indexed, it is desirable that the mass of the table be minimized. Therefore the table is not made so heavy as to be capable of resisting unaided all deflections. Hence means have been provided for transferring stresses to the base so that the table will not be unduly deflected. While giving consideration to reduction of its mass, the table 125 is strengthened by its tubular hub 126 and by tubular portions 226 (Fig. 13) surrounding the compression piston rods 184 and by webs and ribs 227 and 228. The tubular parts 226 are provided with arcuate notches 229, the center of curvature being the center of the hub 126. These notches 229 provide clearance between the tubular parts 226 and the compression piston coupling head 188a or the ejector piston coupling head 205 as the table 125 swings around.

Since the table 125 and parts supported thereby have considerable mass, it is desirable that its rotation be started by somewhat gradual application of fluid pressure to the piston 159 of cylinder 160, the pressure flow increasing as rotation of the table continues and to gradually diminish the flow of pressure fluid as the table approaches the end of its travel so as to minimize the strain on the operating parts and the stops which determine the amount of movement of the rack 150 (Fig. 10). For this purpose, the flow of pressure fluid exhausted from the cylinder 160 is under control by a suitable flow metering valve 240. Fig. 11 shows a Vickers valve having a body 241 and covers 242 and 243. Body 241 provides an inlet 244 and an outlet 245. A valve 246 controls flow from inlet 244 to a chamber 247 which ducts 248 connect with a chamber 249. Valve 246 is connected with a piston 250 operating in a cylinder 251, one end of which is connected by a passage 252 with the outlet 245. The other end of the cylinder 251 is connected by passage 253 with chamber 247. A spring 254 urges the valve 246 toward open position. A shaft 255 which is journaled in the block 241 is so shaped as to provide an adjustable metering orifice 256. The flow control valve 240 as shown in Fig. 11 is a back pressure valve having the adjustable metering orifice 256 that restricts the flow of oil discharged from the cylinder 160. The valve 240 includes a pressure reducing valve 246 which is intended to keep the pressure on the orifice 256 constant and, therefore, it keeps the rate of travel of piston 159 constant so long as the orifice 256 remains the same. The oil discharged from the cylinder 160 flows in at 244 and through the passages 247 and past the orifice 256. If pressure builds up in the orifice 256, it also builds up through the passage 253 on piston 250 to push it down to restrict the flow from passage 244 past the valve 246 until the pressure at the orifice 256 drops. It is therefore apparent that the rate of travel of piston 159 depends on the width of metering orifice 256. Initially, the orifice 256 is relatively narrow as shown in Fig. 11. To adjust the orifice in accordance with movements of piston 159 and rack 150, shaft 255 is connected by lever 257, turnbuckle link 258 and a screw 259 with the disc 148. If rack 150 travels right from the position in Fig. 11 due to the application of pressure fluid upon the left end of piston 159, the oil discharged from the right end of the cylinder 160 will have the greatest restriction to its flow at the beginning of right movement of a rack 150 and counterclockwise movement of pin 259. As these movements continue, the shaft 255 is rotated clockwise to increase the width of the orifice 256 to the maximum approximately at 90° travel of the table 125. As the table continues its movement in the same direction, the shaft 255 is moved to decrease the width of the orifice again, thereby decreasing the rate of travel of the piston 159 and rack 150. Thus the table comes gradually to rest at the end of its 180° movement.

In order that the table will be caused to move in either direction in the same manner as described, it is necessary to provide a valve capable of reversing connections between the ends of cylinder 160 and the fluid pressure source and between the ends of this cylinder and the return to a tank through the flow control valve 240. Fig. 34 shows diagrammatically a reversing valve 260 comprising a body 261 having a port 262 for connection with a fluid pressure source through a pipe u and having ports 263 and 264 connected respectively by pipes s and t with the opposite ends of cylinder 160 and having ports 265 and 266 connected by a pipe r with the inlet 244 of valve 240 whose outlet 245 is connected with a storage tank in a manner to be described. The ports of the body 261 are controlled by rotatable valve 267 of generally cylindrical formation which is provided with equidistance notches 268 for the purpose of establishing the proper connection. These notches are spaced 90° and the portion referred to are spaced 45°. Therefore, when the valve 267 is in the position shown in full lines, u will be connected with s and t will be connected with r. Each time the valve 267 is turned 45° the connections will be reversed, for example, u will be connected with t and s will be connected with r. The turning of the valve 267 intermittently 45° each time is effected by mechanism shown in Figs. 14 and 14A. A cylinder 270 containing a piston 270a (Fig. 34) is mounted on a suitable support 271. Piston 270a is connected with a rod 272 carrying a grooved collar 273 whose groove receives a pin 274 attached to a bar 275 slidable in bracket 276. At its left end, the bar 275 carries a pin 277 pivotally supporting a finger 278 urged clockwise by a spring 279 pushing on plunger 280 and causing the finger 278 to bear against the stop shoulder 281. When the piston 280 moves left, the finger 278 is adapted to engage a toothed disc 282 connected by screws 283 with an indicator 284 and connected to a shaft 285 which is integral with the valve member 267. Each time the piston 270a moves left at its full travel, the finger 278 engages a tooth of the disc 282 to cause the latter to move clockwise 45°. When piston 270a moves in the opposite direction, the disc 282 does not turn because the finger 278 engages a tooth end which moves the finger counterclockwise to move the pin 280 right and to compress the spring 279 until the finger leaves the tooth whereupon the spring returns the finger to its original position. During the right movement of the piston 270a, rotation of the disc 282 is prevented by a pawl 286 which engages a tooth of the wheel 282 as shown. Pawl 286 merely gravitates into retaining position in an installation where the supporting plate 271 is vertical. If that plate were mounted horizontally, it would be necessary to use a spring to urge the pawl 286 in the retaining position.

The apparatus for preheating the molding material comprises a bracket 300 attached to frames 301 and 302 (Figs. 15, 16A, 16B, 17, 19) which provide bearing holder half-shells 303 which support bearings 304 retained by bearing holder caps 305 attached to part 303. Bearings 304 support a shaft 306 connected by couplings 307 and 308 with a shaft 309 passing through an oil seal 310 and journaled in bearings 311 and 312, supported respectively by a plate 314, a gear housing 315 and a plate 316 which are attached together, the housing 315 being integral with a bracket 317 attached to frame 301 which supports another bracket 318 attached to housing 315. Housing 315 encloses a worm gear 320 attached to shaft 309 and a worm 321 meshing with gear 320 and integral with a shaft 322 which is supported by bearings 323 and 324 (Fig. 17) carried respectively by a cap 326 and housing 315 and extending through an oil seal 325 in a cap 327. Shaft 322 is connected with a pulley 330 which a belt 331 connects with a pulley 332 on the shaft 333 of a motor M3 which is supported by a table 335 having ears 336 which a rod 337 pivotally connects with ears 338 of a bracket 39 which, like bracket 300, is supported by the molding machine. The belt 331 is tightened by turning a screw 340 threaded through bracket 339 and engaging the table 335, the screw 340 being fixed by a lock nut 341 (Fig. 16A). So long as motor M3 operates, the shaft 306 rotates.

Shaft 306 supports and drives a heated steel cylinder 350 having a polished chromium surface on which the molding material is deposited and heated. Cylinder 350 is driven by pins 351 connected with a collar 352 welded to shaft 306. The ends of cylinder 350 are thermally insulated by transit rings 353, 354 and 355 in direct engagement with the cylinder 350 which supports also a transit ring 356 and disc 357 which enclose electrical connectors comprising copper rings 358 and 359, which wires 360 and 361 respectively connect with collector rings 362 and 363 and a wire 364 connected with ring 365 and with a thermal switch 366 in the cylinder 350. Rings 358 and 359 are connected respectively with the terminals of heating element 367 as shown in Fig. 19. Collector rings 362, 363 and 365 are supported by and driven by shaft 306 and are insulated therefrom by discs 368, 369 and 370 clamped between washers 371 and 372 by a nut 373 threaded on shaft 306. Rings 362, 363 and 365 are engaged by brushes 374, 375 and 376 respectively supported by non-conducting blocks 377 and 378 supported by a bracket 379 attached to frame 302 (Fig. 22).

The frames 301 and 302 together with the bracket 300 and a bar 380 (attached to frames 301 and 302) provide a pocket for a hopper 381 having ribs 382 and 383 (Fig. 15) received by grooved bars 384 and 385 respectively, attached to frames 301 and 302 respectively. These ribs bottom in the lower ends of the grooves of the bars to support the hopper. The molding material gravitates through an opening 386 (Fig. 21) in the bottom of the hopper and between a flange 387 provided by the hopper rear wall and a flange 388 of a plate 389 attached to lugs 390 pivoted on studs 391 attached to the hopper side walls. Plate 389 has ears 392, through the arcuate slots 393 thereof, there pass screws 394 threaded into the housing side walls. By loosening the screws 394, the flange 388 can be adjusted vertically to determine the thickness of the layer of material deposited upon a spreader roller 400.

Spreader roller 400 is straight knurled longitudinally with V-grooves about $\frac{1}{32}$" deep. It rotates counterclockwise (Fig. 21) and carries the molding material from between the flanges 387 and 388 and drops it upon the heated cylinder 350 in an even layer. As the cylinder 350 rotates counterclockwise, the material is heated and it softens sufficiently to cause the particles to stick together or to the roller so that it does not drop from the roller until removed by a scraper 401 clamped by a bar 402 (Fig. 29) against a bar 403 attached to arms 404 pivoted on pins 405 supported by frames 301 and 302 (Fig. 28). Springs 406, connecting studs 407 on these frames with studs 408 on the arms 404, urge the scraper 401 against the cylinder 350.

The material removed by the scraper gravitates into a funnel 410 attached to arms 411 (Fig. 22) pivotally supported by frames 301 and 302. As shown in Fig. 25, one of the arms 411 is attached to a shaft 412 journaled in a bearing 413 supported by frame 302 and a fixed ratchet ring 414 having teeth 415 engaging teeth in a ring 416 which a spring 417 urges toward ring 414. Shaft 412 carries a pin 418 received by slots 419 in ring 416. When shaft 412 is turned by lever 420 having a handle 421, the ring 416 snaps longitudinally as its teeth are cammed out of the tooth space between the teeth 415 and then jump into said tooth spaces when aligned therewith. This ratchet or detent construction provides for maintaining the shaft 412 and supported funnel 410 in a desired position, one of which would be as shown when filling a mold as required and the other of which would be in a position away from the mold when unloading the molded parts and when cleaning the mold and when placing in the mold metal inserts when used.

The cylinder 350 is engaged by a cleaner bar 425, preferably of laminated cloth with a Bakelite binder. Bar 425 is clamped by a bar 426 (Fig. 27) against a bar 427 having arms 428 pivotally supported on pins or screw studs 429 attached to frames 301 and 302. Each arm 428 is welded to a bar 430 carrying a stud 431 engaged by a hook 432 on a rod 433 which, as shown in Fig. 31, passes through a tube 434 attached to a frame 301 or 302, and is threaded into a nut 435. A spring 436 located between the nut 435 and a shoulder 437 of the tube urges the rod 433 upwardly to force the cleaner bar 425 against the cylinder. Thus the cylinder presents a clean surface to the fresh deposit of molding material. This minimizes the possibility of delivery to the mold of any material which is cured beyond the predetermined stage of partial cure which the cylinder 350 is intended to accomplish.

The cylinder 350 and material carried thereby and dropping therefrom are enclosed by the side frames, a bar 440 (Fig. 21) attached thereto and a cover 441 attached to lugs 442 pivotally supported by pins 443 attached to the side frames. A bar 444 connects the bottom rear edges of the side frames.

The amount of the charge of molding material for a mold is determined in part by the distance of the flange 388 (Fig. 21) above the roller 400 and by the duration of roller 400. The transfer of material by the roller to the cylinder 350 is called dosing and the apparatus which controls the duration of rotation of roller 400 during each cycle of operation is called the doser.

Referring to Fig. 19, bearings 450 supported by the frames 301 and 302 and retained by rings 450a support the roller 400 which carries a pin 451 connected with a clutch part 452 having teeth 453 engageable with similar teeth of a shiftable clutch part 454 attached to a gear 455 meshing with a gear 456 meshing with a gear 457 integral with coupling 308. Gear 456 is pivoted on a rod 458 (Fig. 18) attached to a bracket 459 supported by gear housing bracket 317 (Fig. 19). Gear 456 is retained by a washer 460 and a screw 461 threaded into rod 458. A groove 465 in clutch part 454 receives pins 466 of a yoke 467 welded to arms 468 and 469. Arm 468 is pivoted on a screw 470 threaded into bracket 317 and has a hole 471 (Fig. 30) which receives a screw 472 threaded into frame 301 and retained in the required positions of adjustment by a nut 473. The head of screw 473 limits counterclockwise rotation of arm 468 under the effect of a compression spring 474 located between arm 469 and frame 301 and retained by pins 475 in each. Arm 469 is connected by pin 476, link 477 and pin 478 with the armature 479 of a solenoid 480 whose coil 481 (known as the doser coil) is indicated in Fig. 54. When coil 481 is engaged the clutch parts 452 and 454 are connected and when coil 481 is deenergized, the spring 474 separates these clutch parts and the shaft 400 stops practically immediately because a brake is always effective. This brake, shown in Fig. 20, comprises a drum 485 engaged by a split band 486 having a hole 487 which receives a locating screw 488. The band is urged against the drum by a spring 489 pushing against a washer 490 and the latter against the head of a screw 491 threaded into a nut 491a which is urged by the spring 489 against one part of the band while the spring pushes directly against the other part of the band.

Referring to Fig. 51, the electric current for heating the dies is obtained from a three-phase A. C. source connected with three circuits shown in the right hand portion of this figure by lines of three styles, namely: (1) heavy solid lines, (2) heavy dash lines, (3) heavy dotted lines. These circuits include wires 1, 2 and 3 which a three pole switch A connects with wires 1a, 2a and 3a. An electromagnetic switch B provides contacts 1', 2' and 3' for connecting wires 1a, 2a and 3a, respectively, with wires 1b, 2b and 3b respectively. Switch B includes a magnetic coil b for attracting an armature b1 against the action of a spring b2, said armature being insulatingly connected with contacts 1', 2' and 3', and also a contact 4' for connecting wires 5 and 8. Magnet coil b receives energizing current from secondary a1 of a transformer TR1, whose primary p1 is connected with wires 1a and 2a. The control of current flow from secondary s1 to magnet coil b is effected by a start-stop switch SS1, having a normally open switch contact 7 for connecting wires 6 and 5 with wire 8 and a normally closed contact 10 for connecting wires 8 and 9. When start contact 7 is moved left to connect wires 5 and 6 with wires 8, coil b is connected with secondary s1 to a circuit which includes wire 4, coil b, wire 5, contact 7, wire 8, contact 10 and wire 9. Coil b being energized, the armature b1 moves right to cause movement of contacts 1', 2', 3' and 4', which respectively connect wires 1a and 1b, 2a and 2b, 3a and 3b, and wires 5 and 8. Wires 5 and 8, being connected by contact 4', contact 7 can be released and the circuit between secondary s1 and coil b remains since contact 4' connects wires 5 and 8 which initially has been connected by contact 7. When current is flowing in coil b, indicator lamp 6a burns to indicate that switch B is closed.

Secondary s1 of transformer TR1 supplies current to magnet coils 1e, 2e and 3e, one end of each of these coils being connected with wire 4. The other ends of coils 1e, 2e and 3e are connected respectively by thermal switches 1t, 2t and 3t with wire 5, which is connected by contact 4' of switch B with wire 8 connected by normally closed contact 10 with wire 9 connected with secondary s1. So long as thermal switches 1t, 2t and 3t remain closed, coils 1e, 2e and 3e are energized by the circuit described and such energization is indicated by the burning of lamps 1f, 2f and 3f, respectively. When said coils are energized contacts 1c, 2c and 3c respectively connect wires 1b, 2b and 3b with wires 1d, 2d and 3d. Then the following circuits to heater units are established: (1) wire 1d to units $h_1, h_2, h_3, h_4$ and wire 1b to $h_5, h_7, h_9, h_{11}$, (2) wire 2b to units $h_1, h_3, h_6, h_{12}$, and wire 2d to units $h_7, h_8, h_9, h_{10}$, (3) wire 3b to units $h_2, h_4, h_8, h_{10}$ and wire 3d to units $h_5, h_6, h_{11}, h_{12}$. The load across the wires 1, 2 and 3 is thus substantially equally distributed. Each heater unit receives full voltages and current. The three dies are heated, respectively, by three groups of units namely: $h_1, h_2, h_3, h_4$ and $h_7, h_8, h_9, h_{10}$ and $h_5, h_6, h_{11}, h_{12}$. The thermal switches 1t, 2t and 3t are located respectively in heat receiving relation to the dies which are provided with holes for receiving the heating units and the thermal switches. When a certain temperature of a die is reached, the thermal switch associated with the die will open and thereby effect the opening of the one of the heat circuits so that the heater units of that die will receive one-half the voltage and current that formerly passed and the heating effects of those units will be one-fourth of that which existed before the associated thermal switch opened. For example, with regard to the group of heater units $h_1, h_2, h_3, h_4$ controlled by thermal switch 1t, before switch 1t opens, units $h_1$ and $h_3$ are connected between wires 1 and 2, and units $h_2$ and $h_4$ are connected between wires 1 and 3. When switch 1t opens, relay magnet 1e is deenergized, spring 1g moves contact 1c into open position, and the units are disconnected from wire 1. Units $h_1$ and $h_2$ and units $h_3$ and $h_4$, in series groups, are connected across wires 2 and 3.

Thermal switches $2t$ and $3t$ operate in a similar manner to control the other groups of heater units. In consequence of the foregoing, the die temperature increases rapidly until a desired temperature is reached; and, thereafter, that temperature is maintained with the use of half as much current. For example, full current may be used only during 30% of the time operation of the molding press. This percentage varies according to quantity of molding powder in the die cavities. Sparking at contacts of the thermal switches $1t$, $2t$ and $3t$ is reduced by condensers $C_1$, $C_2$ and $C_3$, respectively.

The cylinder heaters 367 are connected through slip ring 363 and brush 375 with switch contact 1' and through slip ring 362 and brush 374 with contacts $a$ of a relay C. Thermal switch 366 is connected with contact 1' through slip ring 363 and brush 375 and through slip ring 365 and brush 376 with coil $e$ of relay C surrounding its armature $f$ and in parallel with lamp $g$. Switch 366 is normally closed so that coil $e$ is normally energized to close contacts $c$ with contacts $a$ and $b$ to connect the heaters 367 with contact 3'. When the temperature of cylinder 350 exceeds a certain amount, switch 366 opens to cut off heater 367; and switch 366 closes again when the temperature falls below a certain amount.

Motors M1 and M2 are pump motors for operating pumps P1 and P2 of the hydraulic system, Fig. 34. Motor M3 operates the doser roller 400 and the mold material preheating cylinder 350. These motors are connected with three phase A. C. lines 11, 12 and 13 by manual switch D and relay switch E of conventional construction having a coil $e$ for attracting an armature $e1$ against the action of a spring $e2$. A controller SS2 has a start switch 15 and a stop switch 16. When switch 15 is closed, coil $e$ is energized by current from secondary $s1$ of transformer TR1 and contacts 11', 12' 13' and 14' move into circuit closing position to connect the motors M1, M2 and M3 with A. C. lines 11, 12, 13 and to by-pass switch 15. When switch 16 is opened, coil $e$ is deenergized and switch E opens. If any motor is overloaded, one or both of its heater coils 18 heats a thermal switch 17 in series with transformer secondary $s1$ and coil $e$, and switch E opens.

Wires $11b$ and $13b$ are connected with primary $p2$ of transformer TR2 having a secondary $s2$ for applying current to controls which will now be described.

The control circuit (Fig. 52) includes three timers $T_1$, $T_2$ and $T_3$ which are substantially alike. A description of one of them will serve for all. Referring to Fig. 54, timer $T_1$ comprises a synchronous motor TM1 which drives a speed reducer represented by a worm 701 driving a worm gear 702 which drives a shaft 703 having splines 704 which drive a clutch plate 705 which a spring 707 urges against a clutch plate 706. When reset magnet coil RS1 is energized, plate 705 moves away from plate 706. The timer having been reset and coil RS1 deenergized, motor TM1 drives, through the clutch, a shaft 708 carrying a lever 709. As lever 709 moves away from stop 710, a spring 711 anchored at 712 and attached to the lever is additionally wound up. The timer "times out" when lever 709 engages blade 713 $t1$ (connected with terminal 26') and breaks connection with contact 34' and engages contact 40' to effect a control to be described. Blade 713 $t1$ also opens motor switch 714 $t1$ when the timer times out. By means included in Fig. 52, the reset coil RS1 is energized and clutch plate 705 separates from clutch plate 706, and spring 711 returns the lever 709 to start position and blade 713 $t1$ returns to the position shown in Fig. 54 and the motor switch 714 $t1$ is closed and the motor turns plate 705. At the proper instant, the coil RS1 is deenergized and plate 705 is pushed by spring 711 against plate 706, and the timer starts timing. Timers T2 and T3 operate in the same manner. When timer T3 times out, its blade 713 $t3$ separates from contact 31' but does not complete another circuit.

Main control relay MCR (Fig. 52) has a magnet coil $32d$ which, when energized, connects contacts $21r$ and $23r$, $22r$ and $32r$, $28r$ and $26r$. Control relay CR1 has a magnet coil $34d$ which, when energized, connects contacts $29r1$ and $33r1$, $28r1$ and $30r1$, $26r1$ and $34r1$. Control relay has a magnet coil $26d$ which, when energized, connects contacts $40r2$ and $41r2$, $29r2$ and $31r2$.

Push button switch PB1, when closed, connects contacts $26b$ and $26c$. Push button switch PB2, when closed, connects contacts $22a$ and $32a$. Push button switch PB3, normally closed, connects contacts $22b$ and $32c$. Push button switch PB4, when closed, connects contacts $23a$ and $21a$.

Switch SW1, when closed connects lines 26 and 33. Switch SW2, when closed, connects lines 41 and 32. Switch SW4, when operated during indexing or rotation of the turntable 125 connects lines 22 and 24 when the turntable starts to index so that timer T1 will be reset while indexing. When indexing is completed, SW4 connects lines 22 and 26 so that the timer motor TM1 will operate to time the cure.

Coil D is the doser solenoid coil. Coil B is the counter solenoid coil which operates a cycle counter. Coil J is the safety solenoid and coil L is the mold solenoid which operate valves in a hydraulic circuit to be described.

In Fig. 52 certain wires and branches thereof are drawn with lines of different styles, for example, wire 21 connected to secondary $s2$ of transformer TR2 is a heavy solid line, wire 22 also connected to secondary $s2$ is a heavy dash line, wire 23 and its branches are dot-dash lines, and wire 26 and its branches are dotted lines. The various wires or lines are given reference numbers; and the number which is applied to any line is also applied to the terminals and contacts directly connected with that line with appropriate affixes. This is done to facilitate tracing the circuits.

The tracing of circuits is further facilitated by the non-conventional diagram, Fig. 53, to which reference will now be made while explaining the operation.

*Automatic repeat cycle*

To start the automatic cycle, the operator manually closes switches SW1 and SW2 permanently, and manually closes switch PB2 momentarily. Coil $32d$ of relay MCR is energized. Contacts $22r$ and $32r$ are connected in order to by-pass PB2. Contacts $21r$ and $23r$ are connected and safety solenoid J is energized so that the hydraulic system can operate. Contacts $26r$ and $28r$ are connected and timer motor TM1 starts.

Coil $34d$ of relay CR1 is energized through the following circuit: line 21, contacts $21r$, $23r$, line 23, contacts 23', 25' of timer T2, terminal $25t2$, coil 34d, wire 34, terminal 34tl, contacts 34', 26' of timer Tl, terminal 26tl, line 26, contact 26a, switch SW4, line 22. Relay CRI connects 26rl and 34rl, 28rl and 30rl, 29rl and 33rl. Contacts 26r and 28r of relay MCR being already closed, the closing 28rl and 30rl causes mold solenoid L to be energized and molding and curing starts automatically as will be described later. 26rl and 34rl, when connected, by-pass 26' and 34' of timer Tl.

Coil 26d of relay CR2 is energized through the following circuit: 21, 26d, 29, 29rl, 33rl, SWl, 26, SW4, 22. Contacts 40r2 and 41r2 and contacts 29r2 and 31r2 are connected.

The mold solenoid L remains energized altho timer Tl times out and disconnects 26' from 34' and connects 26' with 40'. Since 40r2 and 41r2 are already connected timer motor TM2 is connected and timer T2 begins timing. Also, since switch SW2 is closed during the automatic cycle, doser solenoid D and counter solenoid K are energized. Filling the mold at the loading station begins.

Timer T2 times out and disconnects 23' from 25' and connects 23' with 27'. Coil 34d of relay CRI is deenergized and this relay opens. Motor TM3 is energized through the following circuit: wire 21, contacts 21r and 23r, wire 23, contacts 23' and 27', wire 27, motor TM3, wire 31, contacts 31', 26" of timer T3, wire 26, switch SW4, wire 22. Timer T3 starts timing.

When relay CRI opens, 28rl and 30rl are disconnected and mold solenoid L is deenergized and the upper mold ascends as will be described later in connection with Fig. 34.

Timer T3 times out and separates 26" from 31' and coil 26d of relay CR2 is deenergized and 29r2 separates from 31r2 and 40r2 separates from 41r2 and solenoids D and K are deenergized. Dosing or filling the mold at the loading station stops.

After the upper mold ascends and the compression ram descends, in a manner to be described with reference to Fig. 34, the table starts indexing thereby causing SW4 to disconnect line 22 from line 26 and to connect 22 with 24 so that coil RSI is energized and the timer Tl is reset. Coil RSI is deenergized when indexing ends.

Since relay MCR remains energized, the cycle starts again when indexing ends but can be stopped by opening switch PB3 momentarily.

When timer T2 times out, contact 21' is separated from 25' and is connected with 27' to cause timer T3 to start timing and also to cause the resetting of timer T2. Its reset coil RS2 is energized through the following circuit: wire 21, contacts 21r, 23r of relay MCR, wire 23, contacts 23', 27' of timer T2, coil RS2, contacts 41r2, 40r2 of relay CR2, wire 40, contacts 40', 26' of timer Tl, wire 26, switch SW4 and wire 22.

When timer T3 times out, relay CR2 opens and reset coil RS2 of timer T2 is deenergized.

When timer T2 times out, timer T3 is also reset because its reset coil RS3 is connected as follows: wire 21, contacts 21r, 23r of relay MCR, wire 23, contacts 23', 27' of timer T2, coil RS3, wire 26, switch SW4 and wire 22. When timer T2 is reset, contact 23' separates from contact 27' and coil RS3 is deenergized.

In brief, when timer T2 times out, the reset coils of both timers T2 and T3 are energized. The resetting of timer T2 deenergizes reset coil RS3 of timer T3. The deenergization of the reset coil RS2 of timer T2 awaits the timing-out of timer T3.

*Single cycle semi-automatic operation*

Assume that the table has indexed and switch SW4 connects lines 22 and 26. Switch SWl is left open. Switch PB2 is closed. Relay MCR closes. Safety solenoid J is energized so that hydraulic system can operate. Relay CRl closes and mold solenoid L is energized and the hydraulic system starts. Timer Tl starts.

When timer Tl times out, the machine stops because switch SWl has been left open initially or the operator opens it because he finds he is not keeping pace with the machine, for example, with respect to cleaning the mold at the loading station and loading inserts.

The cycle can be started at will by closing switch PBl momentarily to cause relay CR2 to close. Timer T2 starts. Switch SW2 is closed and the doser solenoid coil D and the counter solenoid coil K are energized. Timer T2 times out and the cycle continues as in the case of the automatic repeat cycle.

If switch PBl is closed before timer Tl times out the cycle continues after Tl times out.

If switch PBl is not closed before timer Tl times out the machine will stop when Tl times out.

When the machine stops for failure to close switch PBl before timer Tl times out, the molds are closed and the pressure ram is applying pressure to the molding material but the doser cannot operate until the operator closes switch PBl which he will not do until the mold at the loading station has been made ready to receive the charge.

These provisions enable an operator to run two machines, one full-automatically and the other semi-automatically if desired.

*Manipulation for setting-up*

When preparing the machine for use, for example, after installing another set of mold dies, it is desirable to try out the machine without a charge of molding material. Switch SW2 is opened and switch SWl is closed. Switch PB2 is closed and the machine starts in automatic cycle. If the operator wishes to stop the cycle and open the molds (cause the upper die to separate from the lower die), switch PB3 (emergency stop) is opened and switch PB4 is closed to cause safety solenoid J to be energized and the upper die will ascend. If PB4 is opened, the machine stops with the upper die uppermost. To close the molds, switch PB2 is closed. If mold alignment is not correct, switch PB3 is momentarily opened and switch PB4 is closed again so that further adjustment can be made. When mold alignment is correct and the machine is otherwise ready, switch PB2 is closed momentarily. Switch PB3 being left closed, relay MCR closes and the cycle starts without the doser operating. If the operation is satisfactory, switch SW2 is closed so that the doser will operate.

*The functions of three timers*

Curing in the mold begins substantially at the start of timing of timer Tl and ends substantially at the start of timing of timer T3. Cure time is substantially the time set by timer Tl plus the time set by timer T2. Dosing begins substantially when timer T2 starts to time and ends when timer T3 times out. The quantity of the charge is determined by the time set by T2 plus the time set by T3, the layer thickness on the spreader roll 400 being the same. The quantity of material can be adjusted by changing the instant in the cycle when timer T1 times out and timer T2 begins to time, without varying the instant in the cycle when timer T3 begins to time. This can be done by adjusting T1 for longer time and T2 for shorter time or vice versa, while permitting T2 to time out at the same instant as before. Cure time in the mold will be the same since it starts at the end of indexing which causes T1 to start timing and ends substantially when T3 starts timing.

Cure time in the mold can be changed without changing dose time since the former can be adjusted by varying the instant in the cycle when timer T3 starts timing.

The extent of preheating the mold material during dosing is under control by the temperature of the cylinder 350 which may be varied by using thermal switches to control for different temperatures. The extent of preheating can be controlled by the layer thickness on the cylinder 350.

In Figs. 34 through 50 which illustrate the hydraulic system, reference letter T refers in each case, to a return pipe leading to an oil tank from which the pumps P1 and P2 withdraw oil and force it through the system. Before the operation of the hydraulic system is described, there follows a description of certain valve units not previously described.

Figure 35:
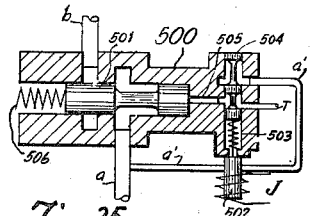
Figure 36:
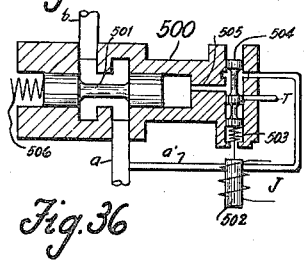

Valve 500 (Figs. 35 and 36) comprises a movable valve 501 which, as shown in Fig. 35, normally blocks the connection between pipes $a$ and $b$. Then the pump P1 cannot force liquid through the pipe $a$. A pressure relief unit $aa$, associated with the pump, then operates to relieve the loading of the pump. The pump has a high pressure stage and a low pressure stage. While the valve 500 is closed, a relief valve in unit $aa$ opens at a certain pressure to relieve the high pressure stage. Another relief valve opens to reduce the low pressure stage to a very low value. The pumped liquid which cannot flow through the pipe $a$ returns to the tank through a pipe $pt$ having a restriction sufficient to produce about 50# back pressure which is sufficient to cause some of the liquid to be forced through a heat exchanger and a filter. As shown in Fig. 36, valve 501 has moved left to connect pipe $a$ with pipe $b$. This is effected by pressure oil entering through $a'$ when valve 504 shown up in Fig. 35, moves down into the position shown in Fig. 36. Downward movement of valve 504 against the action of a spring 503 is effected by downward movement of an armature 502 when solenoid coil J is energized. Coil J is the emergency solenoid. It is automatically energized by the closing of relay switch MCR (Fig. 52) and is deenergized by the opening of said switch PB4. It is temporarily energized by the closing of switch PB4 in order to cause the upper to rise while the machine has stopped.

Figure 37:
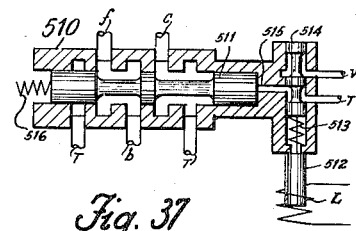
Figure 38:
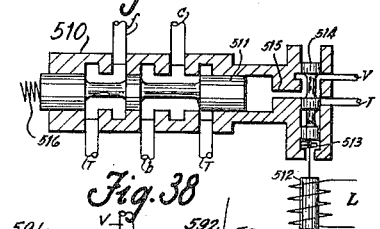
Figure 38A:
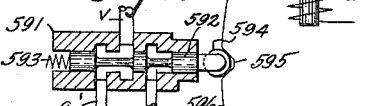

Figs. 37 and 38 show a valve unit 510 having a movable valve 511 which, as shown in Fig. 37, connects $b$ with $f$ but blocks connection between $b$ and $c$ which is connected with T. In Fig. 38, $f$ is blocked from $b$ and is connected with T, and $b$ is connected with $c$. Movement of valve 511 into the position shown in Fig. 38, is effected by oil pressure entering pipe $v$ (connected with $a'$, Fig. 34) when a valve 512 moves down to the position shown in Fig. 38. This movement is effected against the action of spring 513 by downward movement of an armature 514 when a solenoid coil L is energized. This coil is energized automatically following the indexing operation. The connection between pipe $a'$ and pipe $v$ is controlled by a safety valve unit 591 which, as shown in Fig. 38A, has a movable valve member 592 urged right by a spring 593 to cause a roller 594 carried by the valve to be received by either of two diametrically opposite notches 595 in a ring 596 which rotates with the conveyor table. While the table is being indexed, pipe $v$ will be connected with drain T. At the end of the indexing of the table, pipe $v$ is connected with pipe $a'$. Therefore valve unit 591 makes it certain that the valve member 511 of unit 510 will not move to the position shown in Fig. 38 until indexing has been completed. Ring 596 is attached to the table hub 126 as shown in Fig. 10.

Figure 39:
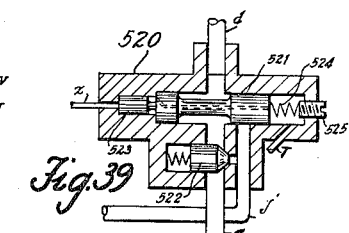
Figure 40:
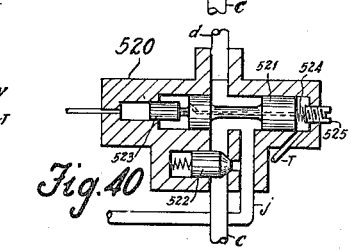

Figs. 39 and 40 show a valve unit 520. In Fig. 39 movable valve element 521 is in position for blocking pipe $j$, from $c$ and $d$ which are always connected through the unit 520. In Fig. 40, valve 521 has moved into position for connecting $c$ with $d$ and also with $j$. Movement of valve 521 into the position shown in Fig. 40 against the action of a spring 524 (adjusted by screw 525) is effected by pressure oil entering the pipe $x$ when the pressure in $x$ builds up to a value such as to overcome the spring 524, check valve 522 permits flow from $j$ to $c$. Valve 520 responds to pressure above the clamp piston 110a after it has lowered to cause the ram piston 190a to rise.

Figures 41, 42:
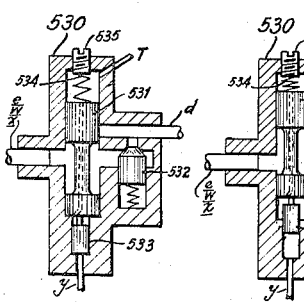

Figs. 41 and 42 show a valve unit 530 having a movable valve 531 held down in Fig. 41 by spring 534 (adjusted by screw 535) and movable up into the position shown in Fig. 42 by oil under pressure entering pipe $y$ when said pressure has attained a value such as to overcome the spring 534. In Fig. 41 valve 530 blocks flow from $e$ (also $w$ and $x$) to $d$. Flow from $d$ to $e$ is permitted by check valve 532. In Fig. 42, valve 531 is located to permit flow from $e$ to $d$. Valve 530 responds to pressure above ram piston 190a after it has lowered to open $e$ to drain so that clamp piston 110a can rise.

Figure 44:
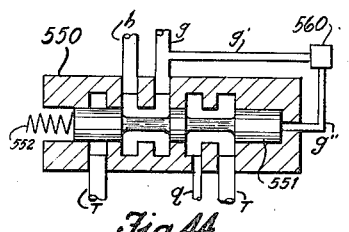
Figure 43:
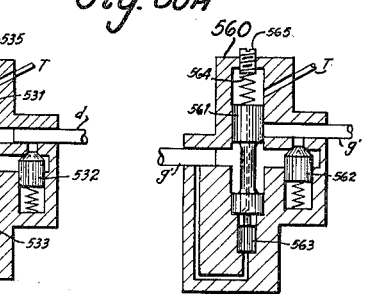

Fig. 43 shows a sequence valve 560 connected as shown in Fig. 44 between $g'$ and $g''$. There can be flow from $g''$ to $g'$ past check valve 562, but not from $g'$ to $g''$ unless valve 561 moves up from the position shown when the pressure in $g'$ is great enough to raise piston 563 and valve 561 against the action of spring 564 adjusted by screws 565.

Figure 45:
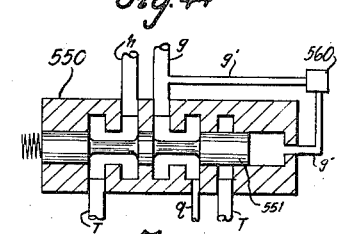

Figs. 44 and 45 show a valve unit 550 having a movable valve member 551 held in the position shown in Fig. 44 by a spring 552 and movable to the position shown in Fig. 45 by pressure oil entering from the pipe $g''$. When the valve 551 is in the position shown in Fig. 44, pipes $h$ and $g$ are connected together and pipe $q$ is connected with drain T. When valve 551 is in the position shown in Fig. 45, $h$ is connected with drain T and $g$ is connected with $q$. Valve 550, controlled by valve 560, responds to pressure underneath clamp piston 110a after it has risen, to relieve pressure above ram piston 190a and above ejection piston 200a and to cause the indexing of the table through the action of piston 270a which reverses valve 260.

Figures 46, 47:
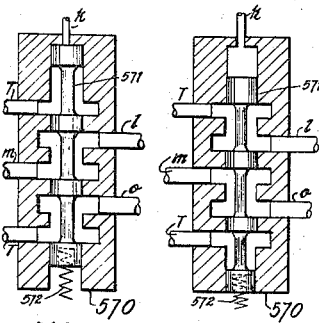

Figs. 46 and 47 show a valve unit 570 having a valve member 561 held in upper position by a spring 572 but movable down into a position as shown in Fig. 47 by oil pressure entering pipe $k$. When valve 561 is located in the position shown in Fig. 46, $m$ is connected with $l$ and $o$ is connected with T. When valve 561 moves down to the position shown in Fig. 47, $l$ is connected with T and $m$ is connected with $o$. Valve 570 withholds connection of the upper end of ejection cylinder 200 with drain until the ram piston 190a has risen when pressure below the piston 190a causes valve 570 to connect pipes m and o so that the ejection piston 200a can be caused to rise when valve 580 is lifted by the pedal 575. After solenoid L is de-energized and valve 510 is conditioned as shown in Fig. 37 and before the clamp piston 110a has risen and before valve 550 is conditioned as shown in Fig. 45, pipe k then having no pressure, valve 570 is conditioned as shown in Fig. 45; and, because pipe h then has pressure and l and m are then connected by valve 570, ejection piston 200a will move down automatically independently of the release pedal 575 to permit valve 580 to lower, pipe p then having no pressure when pipe c is connected with drain by valve 510. Therefore, valve 570 provides for lowering the injection piston automatically before indexing takes place and before the doser discharges material into the die at the loading station.

Figures 48, 49:
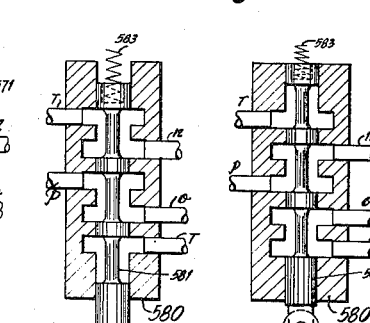

Figs. 48 and 49 show a valve unit 580 having a valve member 581 held down by a spring 583 as shown in Fig. 48 but movable to an upper position by a pedal 575 (Fig. 34) pivoted at 576 and engageable with a roller 582 attached to member 581. When valve 571 is down as shown in Fig. 48, p is connected with o and n is connected with T. When valve 571 is up as shown in Fig. 49, pipe o is connected with T and n is connected with pipe p.

Figure 50:
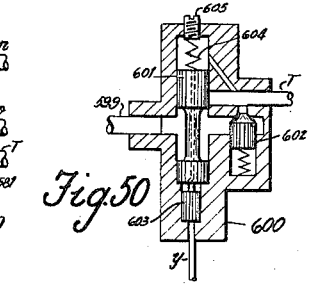

Fig. 50 shows a sequence valve unit 600 which normally blocks pipe 599 from T until the pressure in pipe y is sufficient to raise a piston 603 and a valve member 601 against the action of a spring 604 adjusted by a screw 605.

The system will operate provided emergency solenoid J is energized so that valve 501 of unit 500 is in the position shown in Fig. 36 to connect pipes a and b so that pump P1 is connected by pipes a and b and by valve unit 510 when in the status shown in Fig. 37 with pipe f in order to elevate piston 110a of clamp cylinder 110. As will be explained later, piston 110a does not start to rise until a pressure has been built up in pipes f and y sufficient to move valve 531 of unit 530 into position shown in Fig. 42 so that the oil above piston 110a can escape from e through valve 530 to d and thence through valve unit 520 to pipe c and thence through valve unit 510 to drain T. Piston 110a does not move up until after piston 190a of shot cylinder 190 moves down. Piston 190a moves down since pressure is delivered by pump P1 through a, unit 500, b, unit 510 in the status shown in Fig. 37, pipe f, pipe g, valve unit 550 when in the status shown in Fig. 44, pipe h. Oil escapes from the bottom of cylinder 190 through pipe j past check valve 522 of unit 520, to c and to T of unit 510 in the status shown in Fig. 37. It is after the shot cylinder piston 190a has moved down to the bottom cylinder 190 that pressure builds up in h, g, f and y to such extent that valve 531 of unit 530 can move up to the position as shown in Fig. 42 so that e will be connected with d and hence through unit 520 with c and to T of unit 510, so that the piston 190a can move up.

Fig. 34 shows index piston 159 at the right end of its cylinder 160. The left end of the cylinder 160 receives pressure oil from pipe b through pipe u (including check valve cv) through reversing valve 260 and pipe s. The right end of the cylinder 160 is connected with drain through t, the reversing valve 260, pipe r, valves 240 and 595 which lead to a drain T through a sequence valve 600 provided the pressure in y is sufficient.

Fig. 34 shows knock-out piston 200a at the bottom of its cylinder 200. Piston 200a had been moved to that position by oil pressure from pipe c, pipe p, valve 580 when in the status shown in Fig. 48, pipe o, valve 570 when in the status shown in Fig. 47 and pipe m. The lower end of the cylinder 200 is connected with drain through pipe n, valve unit 580 when in the status shown in Fig. 48, and drain T. After knockout piston 200a had moved down, the pressure above the piston 200a above shot piston 190a is automatically relieved as the result of a movement of valve member 551 of unit 550 into the status shown in Fig. 45 as result of a pressure in pipe g'', which pressure builds up sufficiently after piston 110a of clamp cylinder 110 has arrived at the top of said cylinder. Then h is connected with drain T of unit 550 (in status shown in Fig. 45) and there is no pressure above piston 190a as well as no pressure below it. The upper end of cylinder 200 is connected through m, valve unit 570 (in status shown in Fig. 46), l and h. Therefore, there is no pressure above piston 200a as well as no pressure below it. Therefore the springs are able to relieve pressure at the couplings between the compression plungers of the dies and the shot piston and the knock-out piston. Therefore indexing can take place without frictional resistance due to these connections.

Assuming that clamp piston 110a has just risen to separate the dies as a result of deenergization of the solenoid L as a result of build-up of pressure in g'' following the stopping of piston 110a against the upper end of cylinder 110, valve 550 becomes conditioned as shown in Fig. 45 to connect g with q thereby causing piston 270a to move right from the position shown in Fig. 34 while the exhaust from the right end of the cylinder 270 drains out through p, unit 580 (as in Fig. 48) o, unit 570 (as in Fig. 46), T or to C and out through drain T of unit 510. This causes the reversing valve 260 to reverse thereby connecting u from b to pipe T which causes piston 159 to move left while the left end of cylinder 160 is connected through drain to pipe s, r and valve units 240 and line 599 and valve 600 to drain. Movement of piston 159 left causes the table to be indexed to carry a lower die containing molded material to the unloading station and movement of a charged lower die to the upper die. During indexing timer T1 is reset.

Following indexing, timer T1 starts and the solenoid L of valve 510 is energized and valve 510 is in the status shown in Fig. 38. Pump P1 is then connected through pipe a, unit 500, pipe b, unit 510, pipe c, unit 520, pipe d through check valve 532 of unit 530, pipe e connected with the upper end of cylinder 110. The piston 110a moves down and the lower end of cylinder 110 being connected with drain through f and with drain T of unit 510. At the end of down travel of piston 110a, check valve 532 closes. Pump P2 supplies relatively high pressure to pipe e through a pressure control valve 540 a check valve w' and a pipe w connected with pipe e. This high pressure is determined by the setting of the pressure relief valve 540.

When the pressure against the upper side of the piston 110 reaches the maximum, the pressure communicated from e to valve 520 through pipe x will cause the valve 521 to move to the position shown in Fig. 40, thereby connecting e with j so that the pump P1 will be then connected with the lower end of shot cylinder 190 (pump P2 is blocked from d and c by check valve 532 of unit 530) to cause its piston 190a to move up, thereby effecting upward movement of the die compression piston to force molding material into the die cavities.

After the piston 190a of the shot cylinder reaches the top, pressure builds up in pipe k to cause valve 571 of unit 570 to move down into the position shown in Fig. 47 in order to connect pipes m and o. When pedal 575 is depressed to cause valve 581 of unit 580 to move into position shown in Fig. 49, p is connected with n leading into the lower end of knock-out cylinder 200. Check valve 590 blocks flow from p to z and directly to cylinder 200. Piston 200a rises, the upper end of the piston being connected with drain through m, unit 570 (in the status shown in Fig. 47), pipe o and drain pipe T of unit 586 (then in the status shown in Fig. 49). When pedal 575 is released, piston 200a goes down because pipe p is connected by unit 580 (as in Fig. 48) to o, to m by unit 570 (as in Fig. 47), to the top of cylinder 200 while the bottom of the cylinder is connected through n and drain T of unit 580 (as in Fig. 48).

The timer T2 times out and causes solenoid L of unit 510 to be deenergized and to return to the status shown in Fig. 37, thereby disconnecting b from c and connecting c with drain T. Pipe b is connected with pipe f, therefore oil flows from pump P1 through pipes f and g. Just then oil cannot flow out from the top of cylinder 110 because check valve 532 of unit 530 will close and the unit 530 is just then in the position shown in Fig. 41 which blocks e from d. Therefore, since h is connected with g through unit 550 (then in the status shown in Fig. 44), the shot cylinder piston 190a will move down first since the pressure in moving it down is not built up in y to a value such as to overcome spring 534 of unit 530. The bottom of cylinder 190 is connected with drain of unit 510, through j, unit 520, c and unit 510. After shot cylinder piston 190a has bottomed on the cylinder, pressure in y builds up to raise valve 531 of unit 530 to the position shown in Fig. 42. The top of cylinder 110 is then connected with drain T of unit 510 through e, unit 530, d, unit 520, c, unit 510 in the status shown in Fig. 37. Therefore piston 110a moves up after piston 190a has moved down. After piston 110a has moved up, pressure in f, g, g' builds up to where unit 560 permits flow through g'' to unit 550 to cause its valve 551 to move to the position shown in Fig. 45. Therefore, after piston 110a moves up, h becomes connected with T of unit 550 and there is no pressure above piston 190a as well as no pressure below it. Since l is connected with h, and l with m through unit 570 (in status shown in Fig. 46 since there is no pressure in k, j being connected with drain T of unit 510 through check valve 522 of unit 520, c, and unit 510) there is no pressure above the piston 200a as well as no pressure below it, pressure in p having practically ceased when c becomes connected with T of unit 510. Although the operator should fail to release pedal 575, the bottom of cylinder 200 can drain through z, check valve 590 and p to c and t of unit 510.

Then there is no pressure on either side of the pistons 190a and 200a. Therefore the spring 195 in the bottom of cylinder 190 is effective to raise its piston 190a slightly to relieve the pressure at the T-slot coupling with the compression piston 178 of the die above it. Also, there is a spring 207 associated with piston 200a of cylinder 200 to relieve the pressure between said piston and a T-slot coupling with the compression piston 178 of the die then above the cylinder 200.

When following the movement of shot cylinder piston 190a down, the pressure in y builds up to such extent as to lift the valve 531 of unit 530, pipe w is connected with d. Therefore the pump P2 can pump to drain through w and to d, valve 520, c and T of valve 510.

When valve 551 is in the position shown in Fig. 45, there is pressure in q to effect movement of the piston 270 to ratchet the reversing valve 260. Return of piston 270a from a right position back to the left position shown in Fig. 34 is effected later when the pressure is applied again to pipe p.

When valve 260 is reversed, the piston 159 in the index cylinder 160 moves left by pressure received from b through u and t; and pipe s is then connected with drain T of unit 600 through the flow control valve 240 which starts to close at about 50% of the index stroke, thereby slowing down the indexing so that the table rack will come to a stop without too much shock against the positive stops which limit its stroke. In shunt with valve 240, there is a relief valve 595 which by-passes a few drops of oil from the exhaust line 599 in order to prevent hydraulic shock.

The operation of filling the mold at the loading station with preheated material continues after the mold solenoid L is deenergized following the timing-out of the timer T2 since there is an appreciable lapse of time between deenergization of solenoid L and the indexing of table 125. A substantial portion of this time is taken advantage of in preheating material and filling the mold. Timer T3 is set to time-out and deenergize the dozer solenoid D at an instant far enough ahead of indexing for all of the material left on heating roller 350 after the dosing roller 400 stops to be scraped off and discharged into the mold at the loading station before indexing starts.

The wires for the lower die heater units are brought in to a junction box 610 (Fig. 2) and thence down through a flexible conduit 611 which moves with the table 125. A box 612 (Fig. 5) supported by the table is attached to conduit 611 and provides five sockets to which five plugs 614 are connected. To each plug 614 there is connected a two-wire cable 616. Four of the cables 616 are connected with heater units in dies 122 and 123. The other cable 616 is connected with a thermal switch located in die 122. A cross tube 619 (Fig. 12) connects box 612 with box 613 and certain wires in conduit 611 are passed through tube 619 into box 613 when they are connected with five sockets each receiving a plug 615 (Fig. 2). Four of the plugs 615 are connected with two-wire cables 617 connected with heater units in the dies 122 and 123. The other cable 617 is connected with a thermal switch located in die 123. The upper die is provided with four heater units and a thermal switch which are wired in a manner similar to the wiring of the heater units and thermal switches of the lower dies.

While the embodiment of the present invention as herein disclosed, constitutes a preferred form, it is to be understood that other forms might be adopted, all coming within the scope of the claims which follow.

What is claimed is as follows:

1. A molding machine comprising a conveyor having a plurality of molds each having a compression chamber for receiving molding material and a ram in the compression chamber and movable to locate one mold at a loading station and another mold at a work station, a mold at the work station adapted to engage with the mold located by the conveyor at the work station, a control solenoid, an hydraulic system under control of the solenoid and operable automatically, when the solenoid is energized, to effect in sequence the closing of the molds, the movement of a ram to inject material in the compression chamber of a mold into mold cavities, and operable automatically, when the solenoid is deenergized, to effect in sequence retraction of the ram, separation of the molds and indexing of the conveyor, a doser having provisions for heating molding material and delivering it to the compression chamber of the mold at the loading station, a first timer rendered operative in response to completion of indexing, a second timer rendered operative in response to timing-out of the first timer, a third timer rendered operative in response to timing-out of the second timer and timing-out prior to the next indexing operation, solenoid control means responsive to completion of indexing for effecting energization of the solenoid and responsive to timing-out of the second timer for effecting deenergization of the solenoid and doser control means responsive to timing-out of the first timer for rendering the doser operative and responsive to timing-out of the third timer for rendering the doser inoperative.

2. A molding machine according to claim 1 having manually operable means for controlling the functioning of the means for controlling the doser.

3. A molding machine comprising a conveyor having a plurality of molds each having a compression chamber for receiving molding material and a ram in the compression chamber and movable to locate one mold at a loading station and another mold at a work station, a mold at the work station adapted to engage with the mold located by the conveyor at the work station, a control solenoid, an hydraulic system under control of the solenoid and operable automatically, when the solenoid is energized, to effect in sequence the closing of the molds, the movement of a ram to inject material in the compression chamber of a mold into mold cavities, and operable automatically, when the solenoid is deenergized, to effect in sequence retraction of the ram, separation of the molds and indexing of the conveyor, a doser having provisions for heating molding material and delivering it to the compression chamber of the mold at the loading station, a main control relay, manually operated means for effecting the closing and opening of the main control relay, first and second auxiliary relays, first, second and third timers, a control circuit for the first auxiliary relay which causes it to close provided indexing has stopped and the main control relay is closed and which causes it to open when the second timer times-out, a control circuit for the second auxiliary relay which causes it to close when the first auxiliary relay closes and which causes it to open when the third timer times-out, a control circuit for the first timer which causes it to start timing when indexing stops provided the main control relay is closed, a control circuit for the second timer which causes it to start timing when the first timer times-out provided the second auxiliary relay is closed, a control circuit for the third timer which causes it to start timing when the second timer times-out, a control circuit for the solenoid of the hydraulic system causing it to be energized and deenergized respectively by the closing and opening of the first auxiliary relay, a doser control solenoid which, when energized and deenergized, respectively, causes the doser to be operative and non-operative, and a doser solenoid control causing it to be energized when the first timer times-out and causing it to be deenergized when the second auxiliary relay opens.

4. A molding machine according to claim 3 having manually operable means for controlling the second auxiliary relay in order to control operation of the second timer and the doser.

CHARLES A. NICHOLS.
MAX E. TODD.
WILLIAM A. FLETCHER.
CLARENCE J. KELLER.

REFERENCES CITED

The following references are of record in the file of this patent:

UNITED STATES PATENTS

| Number | Name | Date |
|---|---|---|
| 2,223,034 | Fuchs | Nov. 26, 1940 |
| 2,268,861 | Ellis | Jan. 9, 1942 |
| 2,327,227 | Tucker | Aug. 17, 1943 |
| 2,351,713 | Sayre | June 20, 1944 |